(12) United States Patent
Okamoto et al.

(10) Patent No.: US 9,663,592 B2
(45) Date of Patent: May 30, 2017

(54) MODIFIED ETHYLENE-VINYL ALCOHOL COPOLYMER, METHOD FOR PRODUCING SAME, AND USE OF SAME

(71) Applicant: KURARAY CO., LTD., Kurashiki-shi (JP)

(72) Inventors: Makoto Okamoto, Kurashiki (JP); Keisuke Morikawa, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 344 days.

(21) Appl. No.: 14/419,338

(22) PCT Filed: Aug. 7, 2013

(86) PCT No.: PCT/JP2013/071340
§ 371 (c)(1),
(2) Date: Feb. 3, 2015

(87) PCT Pub. No.: WO2014/024912
PCT Pub. Date: Feb. 13, 2014

(65) Prior Publication Data
US 2015/0210788 A1     Jul. 30, 2015

(30) Foreign Application Priority Data

Aug. 9, 2012 (JP) .................................. 2012-176910
Aug. 9, 2012 (JP) .................................. 2012-176911
Mar. 29, 2013 (JP) .................................. 2013-075421
Mar. 29, 2013 (JP) .................................. 2013-075422
Mar. 29, 2013 (JP) .................................. 2013-075423
Jun. 13, 2013 (JP) .................................. 2013-124390

(51) Int. Cl.
| | | |
|---|---|---|
| *C08F 16/06* | (2006.01) | |
| *B32B 7/12* | (2006.01) | |
| *B32B 27/08* | (2006.01) | |
| *B32B 27/30* | (2006.01) | |
| *B32B 27/32* | (2006.01) | |
| *B32B 27/36* | (2006.01) | |
| *B32B 1/02* | (2006.01) | |

(Continued)

(52) U.S. Cl.
CPC ............... *C08F 16/06* (2013.01); *B32B 1/02* (2013.01); *B32B 7/12* (2013.01); *B32B 27/08* (2013.01); *B32B 27/306* (2013.01); *B32B 27/32* (2013.01); *B32B 27/36* (2013.01); *C08F 8/12* (2013.01); *C08F 22/10* (2013.01); *C08F 216/06* (2013.01); *C08L 29/06* (2013.01); B32B 2307/7242 (2013.01); B32B 2307/7244 (2013.01); B32B 2307/736 (2013.01); B32B 2439/00 (2013.01); B32B 2439/40 (2013.01); B32B 2439/70 (2013.01); Y10T 428/1352 (2015.01); Y10T 428/1397 (2015.01); Y10T 428/31515 (2015.04); Y10T 428/31913 (2015.04); Y10T 428/31938 (2015.04)

(58) Field of Classification Search
CPC .......... C08F 16/06; C08F 8/12; C08F 216/06; C08F 22/10; C08L 29/06; B32B 1/02; B32B 7/12; B32B 27/36; B32B 27/32; B32B 27/306; B32B 27/08; B32B 2439/00; B32B 2439/40; B32B 2439/70; B32B 2307/7242; B32B 2307/7244; B32B 2307/736; Y10T 428/31938; Y10T 428/1397; Y10T 428/31515; Y10T 428/31913; Y10T 428/1352
See application file for complete search history.

(56) References Cited

U.S. PATENT DOCUMENTS 4,590,131 A    5/1986   Yazaki et al.
6,395,358 B1   5/2002   Tai et al.
(Continued)

FOREIGN PATENT DOCUMENTS

JP    43-7547     3/1968
JP    53-99334    8/1978
(Continued)

OTHER PUBLICATIONS

International Search Report Issued Oct. 22, 2013 in PCT/JP13/071340 filed Aug. 7, 2013.

*Primary Examiner* — Robert Jones, Jr.
(74) *Attorney, Agent, or Firm* — Oblon, McClelland, Maier & Neustadt, L.L.P.

(57) ABSTRACT

Provided is a modified ethylene-vinyl alcohol copolymer, wherein the copolymer is represented by a following formula (I), contents (mol %) of a, b, and c based on the total monomer units satisfy following formulae (1) through (3), and a degree of saponification (DS) defined by a following formula (4) is not less than 90 mol %,

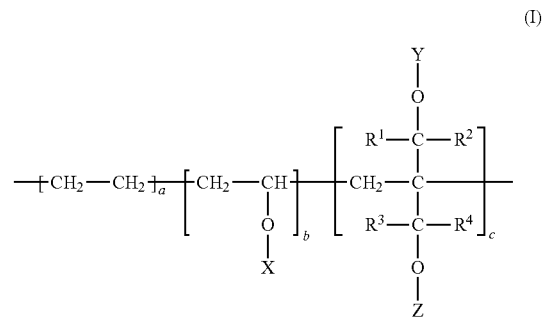

(I)

$18 \leq a \leq 55$            (1)

$0.01 \leq c \leq 20$            (2)

$[100-(a+c)] \times 0.9 \leq b \leq [100-(a+c)]$            (3)

$DS=[$(Total Number of Moles of Hydrogen Atoms in X, Y, and Z)/(Total Number of Moles of X, Y, and Z)$]\times 100$            (4).

31 Claims, 3 Drawing Sheets

(51) Int. Cl.
*C08F 22/10* (2006.01)
*C08L 29/06* (2006.01)
*C08F 216/06* (2006.01)
*C08F 8/12* (2006.01)

(56) References Cited

U.S. PATENT DOCUMENTS

| | | | |
|---|---|---|---|
| 6,485,842 | B1 | 11/2002 | Shindome et al. |
| 2004/0096683 | A1 | 5/2004 | Ikeda et al. |
| 2004/0220366 | A1 | 11/2004 | Ikeda et al. |
| 2007/0178268 | A1 | 8/2007 | Matsui et al. |
| 2010/0280178 | A1 | 11/2010 | Ikeda et al. |

FOREIGN PATENT DOCUMENTS

| | | |
|---|---|---|
| JP | 60-173038 | 9/1985 |
| JP | 10-248482 | 9/1998 |
| JP | 11-348196 | 12/1999 |
| JP | 2001-72823 | 3/2001 |
| JP | 2004-161874 | 6/2004 |
| JP | 2006-123530 | 5/2006 |
| JP | 2013-177576 | 9/2013 |
| WO | 02-060961 | 8/2002 |
| WO | 02-092643 | 11/2002 |
| WO | 2005-121194 | 12/2005 | parison main body side parison main body side

MODIFIED ETHYLENE-VINYL ALCOHOL COPOLYMER, METHOD FOR PRODUCING SAME, AND USE OF SAME

TECHNICAL FIELD

The present invention relates to a modified ethylene-vinyl alcohol copolymer, a method of producing the same, and use of the same.

BACKGROUND ART

Ethylene-vinyl alcohol copolymers (hereinafter, may be abbreviated as EVOH) are excellent in transparency, a gas barrier property, flavor retention, solvent resistance, oil resistance, and the like, and making good use of such properties, are used for wide use including various packaging containers, such as food packaging containers, medical product packaging containers, industrial chemical packaging containers, and agrochemical packaging containers.

For production of such molded article, EVOH is often melt molded, and after that, is secondary processed. For example, stretching in an effort to improve mechanical strength and thermoforming of a multilayer sheet including an EVOH layer to make a container shape are widely carried out.

In recent years, there are increasing demands for stretching at a higher draw ratio and obtaining a molded article in a deeper drawing shape by thermoforming. Since EVOH is a resin having a high modulus of elasticity, there are also increasing demands for a resin having greater flexibility. From such a situation, a resin is desired that is improved in secondary processability and flexibility without decreasing performances, such as transparency, a gas barrier property, flavor retention, solvent resistance, and oil resistance, that EVOH originally has as much as possible.

Patent Document 1 describes modified EVOH obtained by reacting a monofunctional epoxy compound with a hydroxyl group of EVOH and describes that flexibility and secondary processability of the EVOH are improved. However, since the modified EVOH is obtained by reacting an epoxy compound with EVOH in a molten state, there have been problems of increasing production steps and rising production costs.

Patent Document 2 describes a packaging material which has a layer of a composition having a plurality of endothermic peaks in a melting curve by DSC measurement, made by blending a plurality of EVOHs having different vinyl alcohol contents, and describes that it is excellent in a gas barrier property, mechanical properties, and processability. However, in this case, it has not been easy to manage both the gas barrier property and the secondary processability at a high level and it has also been unavoidable to decrease the transparency.

Patent Document 3 describes modified EVOH that is obtained by copolymerizing ethylene, vinyl acetate, and 3,4-diacetoxy-1-butene and then saponifying it, and in which 3,4-dihydroxy-1-butene units are copolymerized, and describes that the modified EVOH is excellent in stretchability, a gas barrier property, appearance, and strength. However, since 3,4-diacetoxy-1-butene has the polymerization reactivity that is equivalent compared with vinyl acetate, most of it turns out to remain after polymerization when the copolymer is taken out at a low conversion. Therefore, loads of washing and wastewater treatment have increased and a rise in production costs have also been unavoidable.

In general, EVOH is often used as a multilayer structure with another thermoplastic resin, such as polyolefin, polystyrene, polyester, and polyamide. However, these thermoplastic resins and EVOH have poor adhesion and are laminated via an adhesive resin, such as maleic anhydride modified polyolefin (polyethylene, polypropylene, ethylene-vinyl acetate copolymer) and an ethylene-ethyl acrylate-maleic anhydride copolymer, but still there are cases that delamination occurs. Accordingly, a resin is also desired that is improved in interlayer adhesion without decreasing performances, such as transparency, a gas barrier property, flavor retention, solvent resistance, and oil resistance, that EVOH originally has as much as possible.

Patent Document 4 describes a coinjection stretch blow molded container of a thermoplastic polyester layer and an EVOH composition layer. The EVOH composition has two kinds of EVOH with different degrees of saponification blended therein, and thus, it is described that good interlayer adhesion is obtained. However, since EVOH having a low degree of saponification is used, there have been cases that thermal stability during melt molding decreases and long-run moldability becomes insufficient.

Patent Document 5 describes that an adhesive layer containing a thermoplastic resin that contains a boronic acid group or a functional group capable of being converted into a boronic acid group in the presence of water is used for production of a multilayer structure including an EVOH layer and another thermoplastic resin layer, and it is described that the multilayer structure thus obtained is excellent in interlayer adhesion. However, since the thermoplastic resin that contains a boronic acid group or a functional group capable of being converted into a boronic acid group in the presence of water is expensive, it has been desired to use an adhesive resin that is more inexpensive and is for general purpose.

Patent Document 6 describes an EVOH composition that contains 500 to 2000 ppm of alkali metal salt in terms of metal elements, and it is described that a multilayer structure including a layer of the EVOH composition has good interlayer adhesion. However, since the EVOH composition contains a large amount of alkali metal salt, the thermal stability at high temperatures is insufficient. For example, for production of a film using the EVOH composition, there has been a risk that problems of defects in appearance, such as coloration, fish eyes, and longitudinal streaks, and odor due to a decomposition gas occur.

Heat shrink films are widely used as a packaging material for foods and the like. In particular, heat shrink films are preferably used as a packaging material for foods that are non-uniform in shape and size, such as meat and its processed foods. Packaging materials for foods are desired to be excellent in a gas barrier property for freshness preservation of the food and excellent in flavor retention. From such a situation, heat shrink films are desired to be, in addition to being excellent in thermal shrinkage, excellent in a gas barrier property, flavor retention, and the like.

As a barrier material used for heat shrink films, polyvinylidene chloride is known (Patent Document 7). However, a toxic gas is generated when a film using polyvinylidene chloride is incinerated. Accordingly, loads on the environment have been great.

In recent years, heat shrink films that are stretched at a higher ratio are desired. By stretching at a high ratio, thermal shrinkage percentage is improved. From such a situation, heat shrink films are desired that are improved in stretchability and thermal shrinkage without decreasing performances, such as transparency, a gas barrier property, flavor retention, solvent resistance, and oil resistance, that EVOH originally has as much as possible.

Patent Document 1 describes a heat shrink film using modified EVOH that is obtained by reacting a monofunctional epoxy compound with a hydroxyl group of EVOH. An example in Patent Document 1 describes a heat shrink film having a layer of the modified EVOH, and it is described that the heat shrink film was good in stretchability, a gas barrier property, and thermal shrinkage. However, as described above, there has been a problem with the modified EVOH that production costs rise. Further, there have been cases that the heat shrink film is insufficient in a barrier property, stretchability, thermal shrinkage, and the like.

Patent Document 3 describes a heat shrink film using modified EVOH that is obtained by copolymerizing ethylene, vinyl acetate, and 3,4-diacetoxy-1-butene and then saponifying it, and in which 3,4-dihydroxy-1-butene units are copolymerized. Then, it is described that the heat shrink film was excellent in stretchability, thermal shrinkage, a gas barrier property, transparency, and delamination resistance. However, as described above, there have been problems with the modified EVOH described in Patent Document 3 that loads of washing and wastewater treatment increase after polymerization and production costs rise. Further, there have been cases that the heat shrink film is still insufficient in a barrier property, stretchability, thermal shrinkage, and the like.

Stretch blow molded containers are used as containers for foods and the like. For example, thermoplastic polyester (hereinafter, may be abbreviated as PES) containers by stretch blow molding are excellent in a variety of properties, such as transparency, mechanical properties, and flavor retention, and moreover, have little concern of elution of residual monomers and harmful additives when employed to be a molded article and are excellent in hygiene and safety, so that they are used in a wide range of fields. However, since their gas barrier properties are not always sufficient, it has been difficult to store beverages, foods, and the like for a long period.

Meanwhile, a coinjection stretch blow molded container using an EVOH layer as a barrier layer is reported. The coinjection stretch blow molded container is produced by, after forming a parison (container precursor), stretch blow molding the parison thus obtained. Generally, a method of producing a parison includes coinjection molding, coextrusion molding, multi-stage injection molding, and the like. Among them, coinjection molding is characterized in that the apparatus is simple, that it generates few scraps such as trimmings and the like, and further that it is possible to structure an EVOH layer completely covered with a PES layer and the like and thus a multilayer containers of good appearance is obtained due to the contact effect by the atmospheric pressure even without an adhesive resin layer between the EVOH layer and the PES layer.

However, when containers filled with beverages, foods, and the like are shocked, for example, by dropping them, separation (delamination) easily occurs between a PES layer and an EVOH layer, which has been a serious problem.

From such a situation, a barrier resin is desired that is excellent in adhesion to another resin and is also flexible. In addition, there are also increasing demands for improvement in moldability. From such a situation, a resin is desired that is improved in adhesion, flexibility, and moldability without decreasing performances, such as transparency, a gas barrier property, flavor retention, solvent resistance, and oil resistance, that EVOH originally has as much as possible.

Patent Document 1 describes a coinjection stretch blow molded container prepared using modified EVOH that is obtained by reacting a monofunctional epoxy compound with a hydroxyl group of EVOH. Then, it is described that the container was capable of preventing interlayer delamination due to impact and was excellent in transparency and a barrier property. However, as described above, there has been a problem with the modified EVOH that production costs rise.

Patent Document 3 describes a coinjection stretch blow molded container prepared using modified EVOH that is obtained by copolymerizing ethylene, vinyl acetate, and 3,4-diacetoxy-1-butene and then saponifying it, and in which 3,4-dihydroxy-1-butene units are copolymerized. Then, it is described that the container was excellent in impact delamination resistance, transparency, pressure resistance, and pressure resistance uniformity. However, as described above, there have been problems with the modified EVOH described in Patent Document 3 that loads of washing and wastewater treatment increase after polymerization and production costs rise.

As a plastic fuel container, those of a monolayer type made of polyethylene are used but they have a disadvantage of having relatively high gasoline permeability. In contrast, a multilayer fuel container is proposed that uses nylon for a barrier layer, that is equipped with high density polyethylene layers on its both sides via adhesive resin layers, and that has a three-material five-layer structure. In addition, a fuel container is also proposed in which nylon is dispersed in a discontinuous thin layer form in a polyethylene layer by mixing nylon with polyethylene for melt extrusion.

However, these fuel containers have been still insufficient in a gasoline barrier property. In addition, they have had a problem in barrier properties to gasoline (hereinafter, may be abbreviated as oxygenated gasoline) in which an oxygen element containing compound, such as methanol, ethanol, and methyl tertiary butyl ether (MTBE), is blended with gasoline, biodiesel fuel that contains biologically derived fatty acid ester, and the like.

Meanwhile, EVOH is also excellent in a fuel barrier property. Then, containers having an EVOH layer are known that they have a fuel barrier property better than the fuel containers described above. However, EVOH has a high modulus of elasticity and there have been cases that the impact resistance becomes a problem in a large container, a container in a complex shape, and the like. Since EVOH has low adhesion to another resin, multilayer containers obtained by laminating EVOH and another resin also have had a problem that delamination due to impact easily occurs. In addition, since EVOH has a high modulus of elasticity, it used not to be easy to secondarily process in a deep drawing shape or in a complex shape.

From such a situation, a resin is desired that is excellent in flexibility and adhesion to another thermoplastic resin and also excellent in secondary processability. That is, a resin is desired that is improved in flexibility, adhesion, and secondary processability without decreasing a fuel barrier property that EVOH originally has as much as possible.

Patent Document 8 describes a fuel container having a layer modified EVOH that is obtained by reacting a monofunctional epoxy compound with a hydroxyl group of EVOH. Then, it is described that the fuel container was good in a fuel barrier property, impact resistance, and moldability. However, as described above, there has been a problem with the modified EVOH that production costs rise.

Patent Document 3 describes a fuel container having a layer of modified EVOH that is obtained by copolymerizing ethylene, vinyl acetate, and 3,4-diacetoxy-1-butene and then saponifying it, and in which 3,4-dihydroxy-1-butene units are copolymerized and it is described that the fuel container is excellent in a fuel barrier performance and the like. However, as described above, there have been problems with the modified EVOH described in Patent Document 3 that loads of washing and wastewater treatment increase after polymerization and production costs rise.

PRIOR ART DOCUMENTS

Patent Documents

Patent Document 1 WO 02/092643 A
Patent Document 2 JP 60-173038A
Patent Document 3 WO 2005/121194 A
Patent Document 4 JP 11-348196A
Patent Document 5 WO 02/060961
Patent Document 6 JP 2001-72823A
Patent Document 7 JP 10-248482A
Patent Document 8 JP 2004-161874A

SUMMARY OF THE INVENTION

Problems to be Solved by the Invention

The present invention has been made to solve the above problems and is to provide a modified ethylene-vinyl alcohol copolymer that is excellent in a barrier property, flexibility, and secondary processability and moreover excellent in productivity. In addition, it is to provide a resin composition, a barrier material, a molded article, a multilayer structure, a heat shrink film, a coinjection stretch blow molded container, and a fuel container that contain the copolymer. In addition, it is to provide a preferred method of producing such modified ethylene-vinyl alcohol copolymer.

Means of Solving the Problems

The above problems are solved by providing a modified ethylene-vinyl alcohol copolymer, wherein the copolymer is represented by a following formula (I), contents (mol %) of a, b, and c based on the total monomer units satisfy following formulae (1) through (3), and a degree of saponification (DS) defined by a following formula (4) is not less than 90 mol %.

[chem 1]

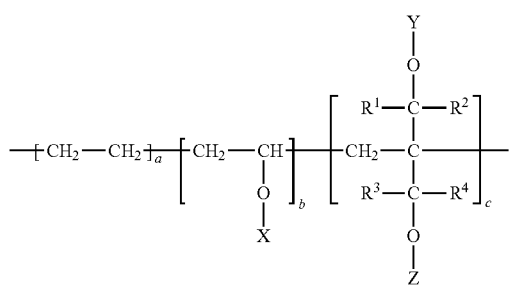

(I)

[In the formula (I), each of $R^1$, $R^2$, $R^3$, and $R^4$ independently denotes a hydrogen atom or an alkyl group having a carbon number of from 1 to 10, and the alkyl group may include a hydroxyl group, an alkoxy group, or a halogen atom. Each of X, Y, and Z independently denotes a hydrogen atom, a formyl group, or an alkanoyl group having a carbon number of from 2 to 10.]

$$18 \leq a \leq 55 \qquad (1)$$

$$0.01 \leq c \leq 20 \qquad (2)$$

$$[100-(a+c)] \times 0.9 \leq b \leq [100-(a+c)] \qquad (3)$$

$$DS=[(\text{Total Number of Moles of Hydrogen Atoms in } X, Y, \text{ and } Z)/(\text{Total Number of Moles of } X, Y, \text{ and } Z)] \times 100 \qquad (4).$$

At this time, it is preferred that $R^1$, $R^2$, $R^3$, and $R^4$ are hydrogen atoms. It is also preferred that each of X, Y, and Z is independently a hydrogen atom or an acetyl group. It is also preferred that an oxygen transmission rate at 20° C. and 85% RH is not more than 100 cc·20 µm/m²·day·atm.

A barrier material comprising the modified EVOH is a preferred embodiment. In addition, a resin composition comprising the modified EVOH is also a preferred embodiment, and it is preferred that the resin composition comprises the modified EVOH and alkali metal salt, wherein the alkali metal salt is contained from 10 to 500 ppm in terms of alkali metal element. This resin composition is preferably produced by making the modified EVOH in contact with an aqueous solution containing alkali metal salt. An extrusion molded article comprising the modified EVOH is also a preferred embodiment. In addition, a film or a sheet comprising the modified EVOH is also a preferred embodiment, and it is preferred that the film or the sheet is stretched to seven times or more in an area ratio. In addition, a laminated film or a laminated sheet comprising a layer of a thermoplastic resin other than the modified EVOH laminated on the film or the sheet is also a preferred embodiment. A thermoformed article comprising the modified EVOH is also a preferred embodiment.

In addition, the above problems are also solved by providing a method of producing the modified EVOH, comprising: obtaining a modified ethylene-vinyl ester copolymer represented by a following formula (IV) by radical polymerization of ethylene, vinyl ester represented by a following formula (II), and an unsaturated monomer represented by a following formula (III); and then saponifying it.

[chem 2]

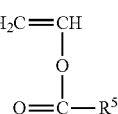

(II)

[In the formula (II), $R^5$ denotes a hydrogen atom or an alkyl group having a carbon number of from 1 to 9.]

[chem 3]

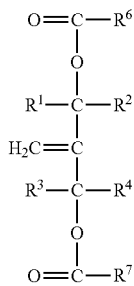
(III)

[In the formula (III), $R^1$, $R^2$, $R^3$, and $R^4$ are same as those in the formula (I). Each of $R^6$ and $R^7$ independently denotes a hydrogen atom or an alkyl group having a carbon number of from 1 to 9]

[chem 4]

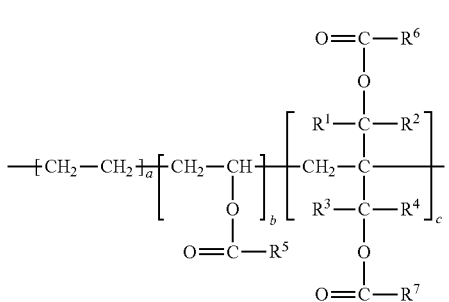
(IV)

[In the formula (IV), $R^1$, $R^2$, $R^3$, $R^4$, $R^5$, $R^6$, $R^7$, a, b, and c are same as the formulae (I) through (III)].

In addition, the above problems are also solved by providing modified ethylene-vinyl ester copolymer, wherein the copolymer is represented by a following formula (IV) and contents (mol %) of a, b, and c based on the total monomer units satisfy following formulae (1) through (3). This modified ethylene-vinyl ester copolymer is a new intermediate in the production method.

[chem 5]

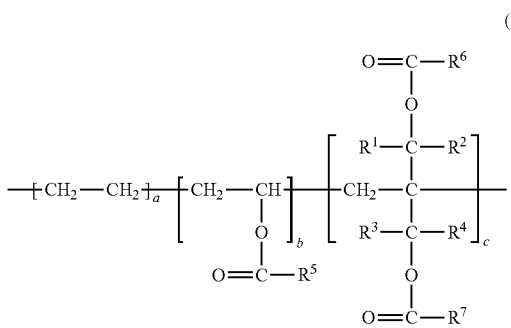
(IV)

[In the formula (IV), each of $R^1$, $R^2$, $R^3$, and $R^4$ independently denotes a hydrogen atom or an alkyl group having a carbon number of from 1 to 10, and the alkyl group may include a hydroxyl group, an alkoxy group, or a halogen atom. Each of $R^5$, $R^6$, and $R^7$ independently denotes a hydrogen atom or an alkyl group having a carbon number of from 1 to 9.]

$$18 \leq a \leq 55 \quad (1)$$

$$0.01 \leq c \leq 20 \quad (2)$$

$$[100-(a+c)] \times 0.9 \leq b \leq [100-(a+c)] \quad (3)$$

In addition, a multilayer structure comprising: a layer of the modified EVOH; and a layer of a thermoplastic resin other than the modified EVOH is also a preferred embodiment of the present invention. It is preferred that, in the multilayer structure, a layer of the modified EVOH and a layer of the thermoplastic resin are adhered via an adhesive resin layer. It is also preferred that the adhesive resin is polyolefin containing a carboxyl group, a carboxylic anhydride group, or an epoxy group.

A heat shrink film comprising a layer of the resin composition is also a preferred embodiment of the present invention. It is preferred that the heat shrink film is stretched to seven times or more in an area ratio. It is also preferred that the heat shrink film further comprising a layer of a thermoplastic resin other than the modified EVOH.

A coinjection stretch blow molded container comprising: a layer of the resin composition; and a layer of a thermoplastic resin other than the modified EVOH is also a preferred embodiment of the present invention. At this time, it is preferred that the thermoplastic resin is at least one selected from the group consisting of polyester, polypropylene, and polyethylene. It is also preferred that, in the coinjection stretch blow molded container, the layer of the thermoplastic resin is arranged to directly make contact with the layer of the resin composition.

A fuel container comprising a layer of the resin composition is also a preferred embodiment of the present invention. It is preferred that the fuel container further comprising a layer of a thermoplastic resin other than the modified EVOH. It is more preferred that an intermediate layer is the layer of the resin composition, and on both sides thereof, inner and outer layers of the thermoplastic resin are arranged via an adhesive resin layer. It is also more preferred to further comprise a regrind layer containing the modified EVOH and the thermoplastic resin. It is preferred that the thermoplastic resin other than the modified EVOH is polyolefin. It is preferred that the fuel container is produced by blow molding and it is also preferred that it is produced by thermoforming.

Effects of the Invention

The modified EVOH of the present invention is excellent in a barrier property, flexibility, and secondary processability. Accordingly, it is possible to be preferably used as a barrier material, a multilayer structure, a heat shrink film, a coinjection stretch blow molded container, and a fuel container. In addition, according to the production method of the present invention, it is possible to efficiently produce the modified EVOH.

MODES FOR CARRYING OUT THE INVENTION

Figure 1:
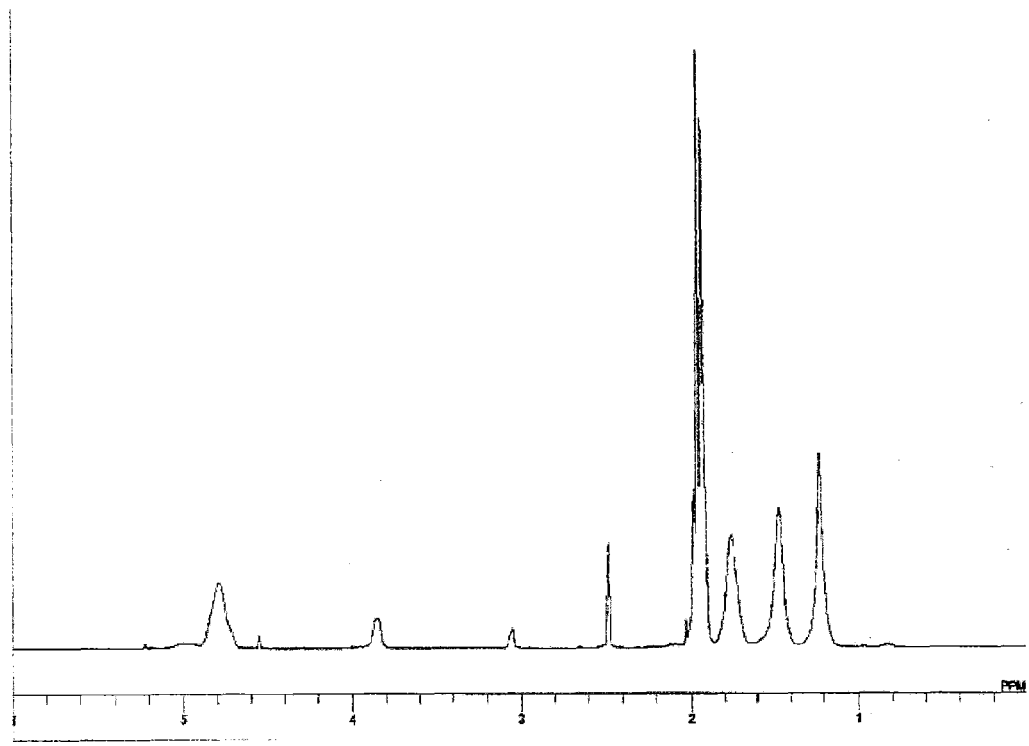
FIG. 1 is a $^1$H-NMR spectrum of a modified ethylene-vinyl acetate copolymer obtained in Example 1.

In a modified ethylene-vinyl alcohol copolymer of the present invention, the copolymer is represented by a following formula (I), contents (mol %) of a, b, and c based on the total monomer units satisfy following formulae (1) through (3), and a degree of saponification (DS) defined by a following formula (4) is not less than 90 mol %. This modified EVOH has, in addition to ethylene units and vinyl alcohol units, monomer units having a 1,3-diol structure in a main chain of the copolymer and thus the crystallinity decreases compared with EVOH not containing the monomer units, so that it is possible to improve flexibility and secondary processability. In addition, since the crystallization rate also decreases compared with EVOH not containing the monomer units, it is also possible to improve the interlayer adhesion of a multilayer structure having a layer of the modified EVOH. Further, with this modified EVOH, since the 1,3-diol structure has strong hydrogen bonding strength, it is possible to reduce decrease in barrier property caused by decrease in crystallinity. That is, while suppressing decrease in barrier performance to a minimum, it is possible to improve adhesion, flexibility, moldability, thermal shrinkage, interlayer adhesion, and secondary processability. Further, as described later, it is possible to produce this modified EVOH at low cost.

[chem 6]

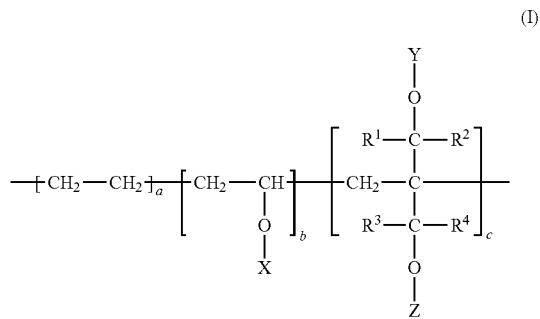

(I)

In the formula (I), each of $R^1$, $R^2$, $R^3$, and $R^4$ independently denotes a hydrogen atom or an alkyl group having a carbon number of from 1 to 10, and the alkyl group may include a hydroxyl group, an alkoxy group, or a halogen atom. Each of X, Y, and Z independently denotes a hydrogen atom, a formyl group, or an alkanoyl group having a carbon number of from 2 to 10.

In the formula (I), each of $R^1$, $R^2$, $R^3$, and $R^4$ independently denotes a hydrogen atom or an alkyl group having a carbon number of from 1 to 10. $R^1$, $R^2$, $R^3$, and $R^4$ may be same groups and may also be different. The structure of the alkyl group is not particularly limited and may have a branched structure and a cyclic structure in part. In addition, the alkyl group may include a hydroxyl group, an alkoxy group, or a halogen atom. $R^1$, $R^2$, $R^3$, and $R^4$ are preferably a hydrogen atom or an alkyl group having a carbon number of from 1 to 5, and more preferably a hydrogen atom. A preferred example of the alkyl group may include a linear or branched alkyl group, such as a methyl group, an ethyl group, an n-propyl group, an isopropyl group, an n-butyl group, an isobutyl group, a tert-butyl group, and a pentyl group.

In the formula (I), each of X, Y, and Z independently denotes a hydrogen atom, a formyl group, or an alkanoyl group having a carbon number of from 2 to 10. The formula (I) has a hydroxyl group in a case that X, Y, or Z is a hydrogen atom, and the formula (I) has an ester group in a case that X, Y, or Z is a formyl group or an alkanoyl group. The alkanoyl group is preferably an alkanoyl group having a carbon number of from 2 to 5 and preferably exemplified by an acetyl group, a propanoyl group, a butanoyl group, and the like. Among them, an acetyl group is particularly preferred. It is preferred that all of X, Y, and Z are a hydrogen atom or a mixture containing a hydrogen atom.

Monomer units containing X is usually obtained by saponifying vinyl ester. Accordingly, it is preferred that X is a mixture of a hydrogen atom with a formyl group or an alkanoyl group having a carbon number of from 2 to 10. Considering availability of the monomer (vinyl acetate) and production costs, it is particularly preferred that X is a mixture of a hydrogen atom with an acetyl group.

Meanwhile, it is possible to produce monomer units containing Y and Z by copolymerizing unsaturated monomer units having a 1,3-diester structure and then saponifying it and it is also possible to produce them by directly copolymerizing unsaturated monomer units having a 1,3-diol structure. Accordingly, both Y and Z may be a hydrogen atom only, and may also be a mixture of a hydrogen atom with a formyl group or an alkanoyl group having a carbon number of from 2 to 10, more preferably a mixture of a hydrogen atom with an acetyl group.

In the modified EVOH of the present invention, contents (mol %) of a, b, and c based on the total monomer units satisfy following formulae (1) through (3).

$$18 \leq a \leq 55 \tag{1}$$

$$0.01 \leq c \leq 20 \tag{2}$$

$$[100-(a+c)] \times 0.9 \leq b \leq [100-(a+c)] \tag{3}$$

The character a denotes a content (mol %) of ethylene units based on the total monomer units, which is from 18 to 55 mol %. When the ethylene unit content is less than 18 mol %, melt moldability of the modified EVOH deteriorates. The character a is preferably not less than 22 mol %. In contrast, when the ethylene unit content is more than 55 mol %, a barrier property of the modified EVOH becomes insufficient. The character "a" is preferably not more than 50 mol %.

The character c a content (mol %) of monomer units containing Y and Z shown at the right edge of the formula (I) based on the total monomer units, which is from 0.01 to 20 mol %. When c is less than 0.01 mol %, adhesion, flexibility, moldability, and secondary processability of the modified EVOH become insufficient. In addition, interlayer adhesion of a multilayer structure having a layer of the modified EVOH becomes insufficient. Further, stretchability and thermal shrinkage of the heat shrink film obtained from it become insufficient. The character c is preferably not less than 0.05 mol %, more preferably not less than 0.1 mol %, and even more preferably not less than 0.5 mol %. In contrast, when c is more than 20 mol %, crystallinity extremely decreases and thus a barrier property of the modified EVOH decreases. The character c is preferably not more than 10 mol % and more preferably not more than 5 mol %. In order to have a particularly excellent barrier property, c is not more than 0.5 mol % and preferably not more than 0.3 mol %.

The character b denotes a content (mol %) of vinyl alcohol units and vinyl ester units based on the total monomer units. This satisfies the following formula (3).

$$[100-(a+c)] \times 0.9 \leq b \leq [100-(a+c)] \quad (3)$$

That is, in the modified EVOH of the present invention, not less than 90% of the monomer units other than the ethylene units and than the monomer units containing Y and Z shown at the right edge of the formula (I) is vinyl alcohol units or vinyl ester units. In a case that the formula (3) is not satisfied, the gas barrier property becomes insufficient. The following formula (3') is satisfied preferably and the following formula (3") is satisfied more preferably.

$$[100-(a+c)] \times 0.95 \leq b \leq [100-(a+c)] \quad (3')$$

$$[100-(a+c)] \times 0.98 \leq b \leq [100-(a+c)] \quad (3'')$$

The modified EVOH of the present invention has a degree of saponification (DS) defined by the following formula (4) is not less than 90 mol %.

$$DS=[(\text{Total Number of Moles of Hydrogen Atoms in } X, Y, \text{ and } Z)/(\text{Total Number of Moles of } X, Y, \text{ and } Z)] \times 100 \quad (4)$$

Here, the "total number of moles of hydrogen atoms in X, Y, and Z" shows a number of moles of the hydroxyl group, and the "total number of moles of X, Y, and Z" shows a total number of moles of the hydroxyl group and the ester group. When the degree of saponification (DS) becomes less than 90 mol %, a sufficient barrier performance is not obtained and moreover thermal stability of the modified EVOH becomes insufficient and gels and hard spots are easily generated during melt molding. In addition, thermal stability decreases and thus long-run moldability during high temperature molding is prone to decrease. The degree of saponification (DS) is preferably not less than 95 mol %, more preferably not less than 98 mol %, and even more preferably not less than 99 mol %. in order to have a barrier property and thermal stability that are particularly excellent, the degree of saponification (DS) is preferably 99 mol %, more preferably not less than 99.5 mol %, and even more preferably not less than 99.8 mol %.

It is possible to obtain the degree of saponification (DS) by nuclear magnetic resonance (NMR). It is also possible to obtain the contents of the monomer units represented by a, b, and c above by NMR. In addition, the modified EVOH of the present invention is usually a random copolymer. It is possible to confirm to be a random copolymer from NMR and results of melting point measurement.

A preferred melt flow rate (MFR) (at 190° C. under a load of 2160 g) of the modified EVOH of the present invention is from 0.1 to 30 g/10 min., more preferably from 0.3 to 25 g/10 min., and even more preferably from 0.5 to 20 g/10 min. It is noted that when the melting point is about 190° C. or over 190° C., the measurements are carried out under a load of 2160 g at two or more temperatures not lower than the melting point. The results are plotted, in a semilog graph, with reciprocals of absolute temperatures as abscissa against logarithms of MFRs as ordinate and the preferable MFR is represented by an extrapolation to 190° C.

Here, in a case that the modified EVOH is made of a mixture of two or more different kinds of modified EVOH, average values calculated from a blend weight ratio are used for the contents of the monomer units represented by a, b, and c, the degrees of saponification, and the MFR.

It is preferred that an oxygen transmission rate of the modified EVOH of the present invention at 20° C. and 85% RH is not more than 100 cc·20 μm/m²·day·atm. The oxygen transmission rate is more preferably not more than 10 cc·20 μm/m²·day·atm and even more preferably not more than 5 cc·20 μm/m²·day·atm.

The method of producing the modified EVOH of the present invention is not particularly limited. For example, it may include a method, comprising: obtaining a modified ethylene-vinyl ester copolymer represented by a following formula (IV) by radical polymerization of ethylene, vinyl ester represented by a following formula (II), and an unsaturated monomer represented by a following formula (III); and then saponifying it.

[chem 7]

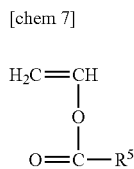

(II)

In the formula (II), $R^5$ denotes a hydrogen atom or an alkyl group having a carbon number of from 1 to 9. A carbon number of the alkyl group is preferably from 1 to 4. Vinyl ester represented by the formula (II) is exemplified by vinyl formate, vinyl acetate, vinyl propionate, vinyl butyrate, vinyl isobutyrate, vinyl pivalate, vinyl versatate, vinyl caproate, and the like. In an economic perspective, vinyl acetate is particularly preferred.

[chem 8]

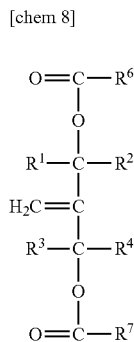

(III)

In the formula (III), $R^1$, $R^2$, $R^3$, and $R^4$ are same as those in the formula (I). Each of $R^6$ and $R^7$ independently denotes a hydrogen atom or an alkyl group having a carbon number of from 1 to 9. A carbon number of the alkyl group is preferably from 1 to 4. The unsaturated monomer represented by the formula (III) may include 2-methylene-1,3-propanediol diacetate, 2-methylene-1,3-propanediol dipropionate, 2-methylene-1,3-propanediol dibutyrate, and the like. Among all, 2-methylene-1,3-propanediol diacetate is preferably used in view of easy production. In a case of 2-methylene-1,3-propanediol diacetate, $R^1$, $R^2$, $R^3$, and $R^4$ are hydrogen atoms and $R^6$ and $R^7$ are methyl groups.

[chem 9]

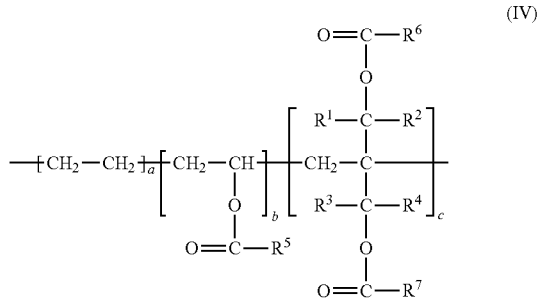

(IV)

In the formula (IV), $R^1$, $R^2$, $R^3$, $R^4$, $R^5$, $R^6$, $R^7$, a, b, and c are same as the formulae (I) through (III). The modified ethylene-vinyl ester copolymer thus obtained is a new polymer and is subjected to saponification treatment after that.

In addition, instead of the unsaturated monomer represented by the above formula (III), an unsaturated monomer represented by the following formula (V) may also be copolymerized, and in this case, only the units derived from the unsaturated monomer represented by the above formula (II) are saponified.

[chem 10]

(V)

In the formula (V), $R^1$, $R^2$, $R^3$, and $R^4$ are same as those in the formula (I). The unsaturated monomer represented by the formula (V) may include 2-methylene-1,3-propanediol.

The unsaturated monomers represented by the formula (III) and the formula (V) used in the present invention have high copolymerization reactivity with vinyl ester monomers, so that copolymerization reaction proceeds easily. Accordingly, it is easy to increase an amount of modification and a degree of polymerization of the modified ethylene-vinyl ester copolymer thus obtained. In addition, an amount of the unreacted unsaturated monomers remaining after polymerization is less even when the polymerization reaction is stopped at a low conversion, so that it is excellent in respect of environment and cost. The unsaturated monomers represented by the formula (III) and the formula (V) are more excellent at this point than other monomers, such as allyl glycidyl ether and 3,4-diacetoxy-1-butene, having a functional group in an allylic position and having only one carbon atom. Here, the unsaturated monomer represented by the formula (III) has higher reactivity than the unsaturated monomer represented by the formula (V).

The mode of polymerization for production of a modified ethylene-vinyl ester copolymer by copolymerizing ethylene, vinyl ester represented by the above formula (II), and the unsaturated monomer represented by the above formula (III) or (V) may be any of batch polymerization, semi-batch polymerization, continuous polymerization, and semi-continuous polymerization. In addition, as the method of polymerization, it is possible to employ a known method, such as a bulk polymerization method, a solution polymerization method, a suspension polymerization method, and an emulsion polymerization method. A bulk polymerization method or a solution polymerization method is usually employed, in which polymerization proceeds without solvent or in a solvent, such as alcohol. In a case of obtaining a modified ethylene-vinyl ester copolymer with a high degree of polymerization, employment of an emulsion polymerization method becomes an option.

Although a solvent used in a solution polymerization method is not particularly limited, alcohol is used preferably, and lower alcohol, such as methanol, ethanol, and propanol, for example, are more preferably used. An amount of solvent in a polymerization reaction liquid may be selected considering the intended viscosity average degree of polymerization of the modified EVOH and chain transfer of the solvent, and a weight ratio of the solvent to the total monomers contained in the reaction liquid (solvent/total monomers) is selected from a range of from 0.01 to 10, preferably a range of from 0.05 to 3.

A polymerization initiator used for copolymerization of ethylene, vinyl ester represented by the above formula (II), and the unsaturated monomer represented by the above formula (III) or (V) is selected in accordance with the method of polymerization from known polymerization initiators, for example, an azo initiator, a peroxide initiator, and a redox initiator. The azo initiator may include, for example, 2,2'-azobisisobutyronitrile, 2,2'-azobis (2,4-dimethylvaleronitrile), and 2,2'-azobis (4-methoxy-2,4-dimethylvaleronitrile). The peroxide initiator may include, for example, percarbonate compounds, such as diisopropyl peroxydicarbonate, di-2-ethylhexyl peroxydicarbonate, and diethoxyethyl peroxydicarbonate; perester compounds, such as t-butylperoxy neodecanoate, α-cumylperoxy neodecanoate, and acetyl peroxide; acetylcyclohexylsulfonyl peroxide; 2,4,4-trimethylpentyl-2-peroxyphenoxyacetate; and the like. Potassium persulfate, ammonium persulfate, hydrogen peroxide, and the like may also be used in combination with the above initiators. The redox initiator is a polymerization initiator in which, for example, the above peroxide initiators and a reducing agent, such as sodium hydrogen sulfite, sodium hydrogen carbonate, tartaric acid, L-ascorbic acid, and rongalite, are combined. An amount of polymerization initiator use is different depending on the polymerization catalyst and thus is not determined unconditionally, and it is adjusted in accordance with the conversion. The amount of polymerization initiator use based on vinyl ester monomers is preferably from 0.01 to 0.2 mol % and more preferably from 0.02 to 0.15 mol %. Although the polymerization temperature is not particularly limited, it is appropriately from room temperature to 150° C. approximately, and preferably not less than 40° C. and not more than a boiling point of a solvent to be used.

For copolymerization of ethylene, vinyl ester represented by the above formula (II), and the unsaturated monomer represented by the above formula (III) or (V), they may be copolymerized in the presence of a chain transfer agent as long as not inhibiting the effects of the present invention. The chain transfer agent may include, for example, aldehydes, such as acetaldehyde and propionaldehyde; ketones, such as acetone and methylethylketone; mercaptans, such as 2-hydroxyethanethiol; and phosphinates, such as sodium phosphinate monohydrate. Among all, aldehydes and ketones are used preferably. Although an amount of adding the chain transfer agent to the polymerization reaction liquid is determined in accordance with the chain transfer constant of the chain transfer agent and the intended degree of polymerization of the modified ethylene-vinyl ester copolymer, it is preferably from 0.1 to 10 parts by mass based on 100 parts by mass of the vinyl ester monomer in general.

It is possible to obtain the modified EVOH of the present invention by saponifying the modified ethylene-vinyl ester copolymer thus obtained. At this time, the vinyl ester units in the copolymer are converted to vinyl alcohol units. In addition, ester bonds derived from the unsaturated monomer represented by the formula (III) are also hydrolyzed at the same time to be converted to a 1,3-diol structure. In such a manner, it is possible to hydrolyze different kinds of ester group by one saponification reaction at the same time.

It is possible to employ a known method for a method of saponifying the modified ethylene-vinyl ester copolymer. The saponification reaction is usually carried out in an alcohol or hydrous alcohol solution. Alcohol preferably used at this time is lower alcohol, such as methanol and ethanol, and particularly preferably methanol. Alcohol or hydrous alcohol used for the saponification reaction may contain another solvent, as long as the solvent is not more than 40 weight % of its weight, such as acetone, methyl acetate, ethyl acetate, and benzene. The catalyst used for the saponification is, for example, alkali metal hydroxides, such as potassium hydroxide and sodium hydroxide; alkali catalysts, such as sodium methylate; and acid catalysts, such as mineral acid. Although the temperature to carry out the saponification is not limited, it is preferably in a range of from 20° C. to 120° C. In a case that gelatinous products precipitate as the saponification proceeds, it is possible to obtain modified EVOH by grinding the products and then washing and drying them.

A modified ethylene-vinyl alcohol polymer of the present invention may contain a structural unit derived from another ethylenic unsaturated monomer that is copolymerizable with ethylene, vinyl ester represented by the above formula (II), and the unsaturated monomer represented by the above formula (III) or (V) as long as not inhibiting the effects of the present invention. Such ethylenic unsaturated monomer may include, for example, α-olefins, such as propylene, n-butene, isobutylene, and 1-hexene; acrylic acid and salts thereof; unsaturated monomers containing an acrylic ester group; methacrylic acid and salts thereof; unsaturated monomers containing a methacrylic ester group; acrylamide, N-methylacrylamide, N-ethylacrylamide, N,N-dimethylacrylamide, diacetoneacrylamide, acrylamide propane sulfonic acid and salts thereof, and acrylamidopropyl dimethylamine and salts thereof (for example, quaternary salts); methacrylamide, N-methylmethacrylamide, N-ethylmethacrylamide, methacrylamide propane sulfonic acid and salts thereof, and methacrylamidopropyl dimethylamine and salts thereof (for example, quaternary salts); vinyl ethers, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, and 2,3-diacetoxy-1-vinyloxypropane; vinyl cyanides, such as acrylonitrile and methacrylonitrile; vinyl halides, such as vinyl chloride and vinyl fluoride; vinylidene halides, such as vinylidene chloride and vinylidene fluoride; allyl compounds, such as allyl acetate, 2,3-diacetoxy-1-allyloxypropane, and allyl chloride; unsaturated dicarboxylic acids, such as maleic acid, itaconic acid, and fumaric acid, and salts thereof or esters thereof; vinylsilane compounds, such as vinyltrimethoxysilane; and isopropenyl acetates.

It is possible to make a resin composition by blending another component in the modified EVOH of the present invention thus obtained. In particular, as described later, in a heat shrink film, a coinjection stretch blow molded container, and a fuel container using the modified EVOH, the resin composition is used preferably. For example, it is also possible to make a resin composition that has thermoplastic resins other than the modified EVOH, plasticizers, lubricants, stabilizers, surfactants, colorants, ultraviolet absorbers, antistatic agents, desiccants, crosslinkers, metal salts, fillers, reinforcing agents, such as various fibers, and the like blended therein.

Among all, it is preferred that the modified EVOH of the present invention contains alkali metal salt. By making a resin composition containing alkali metal salt in such a manner, interlayer adhesion when laminated to a resin other than the modified EVOH becomes good. Although cationic species of the alkali metal salt is not particularly limited, it is preferably sodium salt or and potassium salt. Anionic species of the alkali metal salt is also not particularly limited. It is possible to add as salt of carboxylic acid, salt of carbonic acid, salt of hydrogencarbonic acid, salt of phosphoric acid, salt of hydrogenphosphoric acid, salt of boric acid, hydroxide, and the like. It is preferred that an alkali metal salt content in the resin composition is from 10 to 500 ppm in terms of alkali metal element. The interlayer adhesion may be insufficient in a case that the alkali metal salt content is less than 10 ppm, and it is more preferably not less than 50 ppm. In contrast, the melt stability may be insufficient in a case that the alkali metal salt content is more than 500 ppm, and it is more preferably not more than 300 ppm.

It is also preferred that the modified EVOH of the present invention contains a phosphoric acid compound. By making a resin composition containing a phosphoric acid compound in such a manner, it is possible to prevent coloration during melt molding. The phosphoric acid compound used for the present invention is not particularly limited, and it is possible to use various acids, such as phosphoric acid and phosphorous acid, and salts thereof. Although the phosphate may be contained in any form of primary phosphate, secondary phosphate, and tertiary phosphate, primary phosphate is preferred. Although its cationic species is also not particularly limited, alkali metal salt is preferred. Among them, sodium dihydrogen phosphate and potassium dihydrogen phosphate are preferred. It is preferred that the phosphoric acid compound content in the resin composition is preferably from 5 to 200 ppm in terms of phosphate radicals. The coloration resistance during melt molding may be insufficient in a case that the phosphoric acid compound content is less than 5 ppm. In contrast, the melt stability may be insufficient in a case that the phosphoric acid compound content is more than 200 ppm, and it is more preferably not more than 160 ppm.

The modified EVOH of the present invention may contain a boron compound. By making a resin composition containing a boron compound in such a manner, it is possible to suppress torque variation during melting by heating. The boron compound used for the present invention is not particularly limited and may include boric acids, borates, salts of boric acids, boron hydrides, and the like. Specifically, the boric acids may include orthoboric acid, metaboric acid, tetraboric acid, and the like; the borates may include triethyl borate, trimethyl borate, and the like; the salts of boric acids may include alkali metal salts, alkaline earth metal salts of various boric acids mentioned above, borax, and the like. Among these compounds, orthoboric acid (hereinafter, may be described simply as boric acid) is preferred. It is preferred that the boron compound content is preferably from 20 to not more than 2000 ppm in terms of boron element. The suppression of torque variation during melting by heating may become insufficient in a case that the boron compound content is less than 20 ppm, and it is more preferably not less than 50 ppm. In contrast, in a case that the boron compound content is more than 2000 ppm, gelation easily occurs and the moldability may deteriorate, and it is more preferably not more than 1000 ppm.

In addition, as long as not inhibiting the effects of the present invention, in order to improve melt stability and the like, it is allowed to contain from 0.001 to 1 weight % of one or more kinds of hydrotalcite compound, hindered phenol-based and hindered amine-based heat stabilizers, metal salt of higher fatty carboxylic acid (for example, calcium stearate, magnesium stearate, and the like) in the resin composition. Specific examples of other components may include the following.

Antioxidant: 2,5-di-t-butylhydroquinone, 2,6-di-t-butyl-p-cresol, 4,4'-thiobis-(6-t-butylphenol), 2,2'-methylene-bis-(4-methyl-6-t-butylphenol), octadecyl-3-(3',5'-di-t-butyl-4'-hydroxyphenyl)propionate, 4,4'-thiobis-(6-t-butylphenol), and the like.

Ultraviolet absorber: ethylene-2-cyano-3,3'-diphenyl acrylate, 2-(2'-hydroxy-5'-methylphenyl)benzotriazole, 2-(2'-hydroxy-3'-t-butyl-5'-methylphenyl) 5-chlorobenzotriazole, 2-hydroxy-4-methoxybenzophenone, 2,2'-dihydroxy-4-methoxybenzophenone, and the like.

Plasticizer: dimethyl phthalate, diethyl phthalate, dioctyl phthalate, wax, liquid paraffin, phosphates, and the like.

Antistatic agent: pentaerythritol monostearate, sorbitan monopalmitate, sulfated polyolefins, polyethylene oxide, Carbowax, and the like.

Lubricant: ethylene bisstearoamide, butyl stearate, and the like.

Colorant: carbon black, phthalocyanine, quinacridon, indoline, azo pigments, red oxide, and the like.

Filler: glass fiber, vallastonite, calcium silicate, and the like.

Usually, the resin composition contains not less than 50 weight % of the modified EVOH. From the perspective of barrier property, the resin composition preferably contains not less than 75 weight % of the modified EVOH, more preferably contains not less than 95 weight %, and even more preferably contains not less than 98 weight %.

A method of producing the resin composition is not particularly limited. It is possible to obtain the resin composition by mixing the modified EVOH with other components in a known method. In addition, it is also possible to obtain the resin composition by immersing the modified EVOH in an aqueous solution in which other components are dissolved to contain the other components in the modified EVOH.

A method of molding the modified EVOH of the present invention is not particularly limited. Although it is possible to mold it using a solution of the modified EVOH, melt molding is preferred. By melt molding, various molded products, such as films, sheets, containers, pipes, and fibers, are obtained. Among all, films and sheets requires flexibility and are often made by stretching process after melt molding, so that they are suitable applications to use the modified EVOH of the present invention. A melt molding method is exemplified by methods, such as extrusion molding, injection molding, inflation molding, press molding, and blow molding. Among all, an extrusion molded article containing modified EVOH is a preferred embodiment.

A molded article of the modified EVOH of the present invention is used as, in many cases, a multilayer structure comprising: a layer of the modified EVOH; and a layer of a thermoplastic resin other than the modified EVOH. In particular, layer constitution is preferred in which a modified EVOH layer is an intermediate layer and layers of the thermoplastic resin are arranged in outer layers on its both sides. It is also preferred that the modified EVOH layer and the thermoplastic resin layers are adhered via an adhesive resin layer. The modified EVOH layer is in charge of a barrier property, and it has a thickness of usually from 3 to 250 µm and preferably from 10 to 100 µm. Meanwhile, the thermoplastic resin other than the modified EVOH used for the outer layers is not particularly restricted and is selected appropriately considering required performances, such as moisture permeability, thermal resistance, a heat sealing property, and transparency, and applications. Although a thickness of the entire multilayer structure is not particularly limited, it is usually from 15 to 6000 µm. A laminated film or a laminated sheet comprising a layer of a thermoplastic resin other than the modified EVOH laminated on the film or the sheet containing the modified EVOH is a preferred embodiment.

The thermoplastic resin other than the modified EVOH used for a layer laminated to the modified EVOH layer of the present invention is exemplified by polyolefins, such as polyethylene, polypropylene, ethylene-vinyl acetate copolymers, and ethylene-(meth)acrylic ester copolymers; polyamide; polyester; polystyrene; polyvinyl chloride; acrylic resins; polyvinylidene chloride; polyacetal; polycarbonate; and the like.

It is possible to obtain the multilayer structure in various production methods, and it is possible to employ coextrusion, dry lamination, sandwich lamination, extrusion lamination, coextrusion lamination, solution coating, and the like. Among them, coextrusion is a method in which modified EVOH and a thermoplastic resin other than the modified EVOH are extruded at the same time from an extruder and laminated in a molten state to be discharged in the form of multilayer film from the die exit. In a case of forming a film by coextrusion, a method is preferred in which the modified EVOH layer and the thermoplastic resin layers are laminated by sandwiching the adhesive resin layers. As the adhesive resin, it is preferred to use polyolefin containing a carboxyl group, a carboxylic anhydride group, or an epoxy group. Such adhesive resin is excellent in adhesion to the modified EVOH and also adhesion to those not containing a carboxyl group, a carboxylic anhydride group, or an epoxy group among the thermoplastic resin other than the modified EVOH.

Polyolefin containing a carboxyl group may include polyolefins having copolymerized acrylic acid and methacrylic acid and the like. At this time, as represented by ionomers, all or part of carboxyl groups contained in polyolefin may be present in the form of metal salt. Polyolefin containing a carboxylic anhydride group may include polyolefins that are graft modified with maleic anhydride and itaconic acid. In addition, the polyolefin-based resin containing an epoxy group may include polyolefins having copolymerized glycidyl methacrylate. Among the polyolefin containing a carboxyl group, a carboxylic anhydride group, or an epoxy group, polyolefins modified with carboxylic anhydride, such as maleic anhydride, particularly polyethylene and polypropylene are preferred in view of excellent adhesion.

It is preferred that the molded article thus obtained is subjected further to secondary processing. The modified EVOH of the present invention is excellent in secondary processability. A method of secondary processing is exemplified by uniaxial stretching, biaxial stretching, stretch blow molding, thermoforming, rolling and the like. In particular, a film or a sheet stretched at a high ratio is a preferred embodiment of the present invention. Specifically, a film or a sheet stretched to seven times or more in an area ratio is a particularly preferred embodiment. Prior to secondary processing, crosslinking by radiation exposure and the like may be applied.

The molded article of the present invention thus obtained is excellent in a barrier property, flexibility, and secondary processability, so that it is molded in various shapes, such as a film, a cup, and a bottle and it is possible to be preferably used as various containers and the like.

Among all, a thermoformed article containing the modified EVOH of the present invention is a preferred embodiment. Thermoforming in the present invention means to heat film, a sheet, or the like for softening, and after that, to mold in a mold shape. A molding method may include, as preferred ones, methods of molding in a mold shape using a vacuum or a compressed air and using a plug together as needed (straight forming, drape forming, air slip forming, snap back forming, plug assist forming, and the like), methods of press molding, and the like. Various molding conditions, such as a molding temperature, a degree of vacuum, a pressure of compressed air, a rate of molding, or the like are set appropriately by the shape of the plug, the mold shape, the properties of the material film or the material sheet, or the like. The molding temperature for thermoforming the multilayer film or the multilayer sheet is not particularly limited and is adjusted appropriately depending on the layer constitution of the multilayer film or the multilayer sheet. For example, it is preferred that the molding temperature is from 130 to 200° C.

A heat shrink film, a coinjection stretch blow molded container, and a fuel container using a resin composition containing the modified EVOH of the present invention are also preferred embodiments of the present invention. Descriptions are given below to them.

A heat shrink film comprising a layer of the resin composition of the present invention is a preferred embodiment of the present invention. The heat shrink film is excellent in a barrier property, stretchability, and thermal shrinkage, and moreover, also excellent in productivity. Descriptions are given below to the heat shrink film.

Although it is possible to obtain the film by molding using a solution of the modified EVOH, it is preferred to obtain the film by melt molding the resin composition. The heat shrink film may be a monolayer film of only a layer of the resin composition. A melt molding method employed for production of the monolayer film is exemplified by methods, such as extrusion molding and inflation molded. The monolayer film has a thickness of preferably from 3 to 5000 μm and more preferably from 10 to 500 μm. The film thus obtained is subjected to a stretching process described later.

It is preferred that the heat shrink film is a multilayer film having a layer of a resin composition containing the modified EVOH of the present invention (hereinafter, may be abbreviated as a resin composition layer) and a layer of a thermoplastic resin other than the modified EVOH (hereinafter, may be abbreviated as a thermoplastic resin layer). At this time, constitution to arrange the resin composition layer in one of the outer layers and the thermoplastic resin layer in the other outer layer or constitution to have the resin composition layer as an intermediate layer and arrange the thermoplastic resin layers in the outer layers on its both sides is preferred, and the latter is more preferred. It is also preferred that the resin composition layer and the thermoplastic resin layers are adhered via an adhesive resin layer.

In the multilayer film before stretching, the resin composition layer has a thickness of preferably from 3 to 250 μm and more preferably from 10 to 100 μm. Meanwhile, the thickness of the thermoplastic resin layers is not particularly restricted and is selected appropriately considering required performances, such as moisture permeability, thermal resistance, a heat sealing property, and transparency, and applications. Although a thickness of the entire multilayer film before stretching is not particularly limited, it is usually from 15 to 6000 μm.

The thermoplastic resin other than the modified EVOH used for the thermoplastic resin layers of the heat shrink film may include polyethylenes, such as linear low density polyethylene, low density polyethylene, very low density polyethylene, medium density polyethylene, and high density polyethylene; homo- or co-polymers of olefin, such as ethylene-vinyl acetate copolymers, ionomers, ethylene-propylene (block or random) copolymers, ethylene-(meth)acrylic acid copolymers, ethylene-(meth)acrylic ester copolymers, polypropylene, propylene-α-olefin copolymers, polybutene, and polypentene, or polyolefins, such as those graft modified with unsaturated carboxylic acid or esters thereof; polyester; polyamide (including copolyamide); polyvinyl chloride; polyvinylidene chloride; acrylic resins; polystyrene; polyvinyl ester; polyester elastomers; polyurethane elastomers; chlorinated polystyrene; chlorinated polypropylene; aromatic polyketone or aliphatic polyketone, and polyalcohol obtained by reducing them; polyacetal; polycarbonate; and the like. Among all, ethylene-vinyl acetate copolymers, ionomers, and polyethylene are preferably used from the perspective of excellent heat sealing property and thermal shrinkage, and polyamide is preferably used from the perspective of excellent mechanical strength, such as piercing strength and pinhole resistance.

Constitution examples of the heat shrink film in a case of using polyolefin as the thermoplastic resin other than the modified EVOH used for the thermoplastic resin layers of the heat shrink film may preferably include polyethylene layer/adhesive resin layer/resin composition layer/adhesive resin layer/polyethylene layer, polypropylene layer/adhesive resin layer/resin composition layer/adhesive resin layer/polypropylene layer, ionomer layer/adhesive resin layer/resin composition layer/adhesive resin layer/ionomer layer, ethylene-vinyl acetate copolymer layer/adhesive resin layer/resin composition layer/adhesive resin layer/ethylene-vinyl acetate copolymer layer, and the like.

In a case of using polyamide as the thermoplastic resin other than the modified EVOH used for the thermoplastic resin layers of the heat shrink film, constitution in which a polyamide layer is adjacent to the resin composition layer is preferably used. By such constitution, excellent barrier property and anti-piercing strength are obtained. Further, compared with a case of using a general purpose barrier resin instead of the resin composition layer, transparency after shrinkage is excellent. Constitution in which the adhesive resin layer is not sandwiched between the polyamide layer and the resin composition layer is more preferred.

In such a manner, constitution in a case that a polyamide layer is adjacent to the resin composition layer is exemplified, with a polyamide layer as N and the modified EVOH and a thermoplastic resin layer other than polyamide as T, by constitution, such as N/resin composition layer/T, T/N/resin composition layer/N/T, N/resin composition layer/N/T, and N/N/modified EVOH layer/N/T. Preferred ones may include N/resin composition layer/adhesive resin layer/ethylene-vinyl acetate copolymer layer, polyethylene layer/adhesive resin layer/N/resin composition layer/N/adhesive resin layer/polyethylene layer, N/resin composition layer/N/adhesive resin layer/polyethylene layer, N/adhesive resin layer/N/resin composition layer/N/adhesive resin layer/polyethylene layer, and the like.

It is possible to obtain the multilayer film in various production methods, and the methods described above and the like are employed for a method of producing the multilayer structure. In a case of forming a film by coextrusion, a method is preferred in which a layer of the resin composition containing the modified EVOH of the present invention and the thermoplastic resin layers are laminated by sandwiching the adhesive resin layers. As the adhesive resin, those described above as the adhesive resin used for the multilayer structure are used.

It is preferred that the monolayer or multilayer film before stretching thus obtained has an oxygen transmission rate at 20° C. and 85% RH of not more than 100 cc·20 μm/m²·day·atm. The oxygen transmission rate is more preferably not more than 10 cc·20 μm/m²·day·atm and even more preferably not more than 5 cc·20 μm/m²·day·atm.

The monolayer or multilayer film thus obtained is stretched. The stretching may be uniaxial stretching and may also be biaxial stretching. The biaxial stretching may be simultaneous biaxial stretching and may also be sequential biaxial stretching. A stretching method is exemplified by tenter stretching, tubular stretching, roll stretching, and the like. It is preferred that the heat shrink film is stretched at a high ratio. Specifically, a heat shrink film stretched to seven times or more in an area ratio is particularly preferred. The stretching temperature is usually from 50 to 130° C. Before stretching the film, crosslinking by radiation exposure and the like may be applied. From the perspective of enhancing the shrinkability more, it is preferred to immediately cool the film after stretching.

It is preferred that the heat shrink film of the present invention thus obtained has an oxygen transmission rate at 20° C. and 85% RH of not more than 50 cc·20 μm/m²·day·atm. The oxygen transmission rate is more preferably not more than 10 cc·20 μm/m²·day·atm and even more preferably not more than 5 cc·20 μm/m²·day·atm.

The heat shrink film of the present invention is excellent in a barrier property, stretchability, and thermal shrinkage, and moreover, also excellent in productivity. Accordingly, it is used preferably as a material for various packaging containers, such as food packaging containers, medical product packaging containers, industrial chemical packaging containers, and agrochemical packaging containers.

A coinjection stretch blow molded container having a layer of the resin composition containing the modified EVOH of the present invention and a layer of the thermoplastic resin other than the modified EVOH is also a preferred embodiment of the present invention. Descriptions are given below to the coinjection stretch blow molded container. By using a layer of the resin composition containing the modified EVOH, it is possible to have the coinjection stretch blow molded container excellent in impact resistance, a barrier property, moldability, and transparency and also produce it at low cost.

Figure 5:
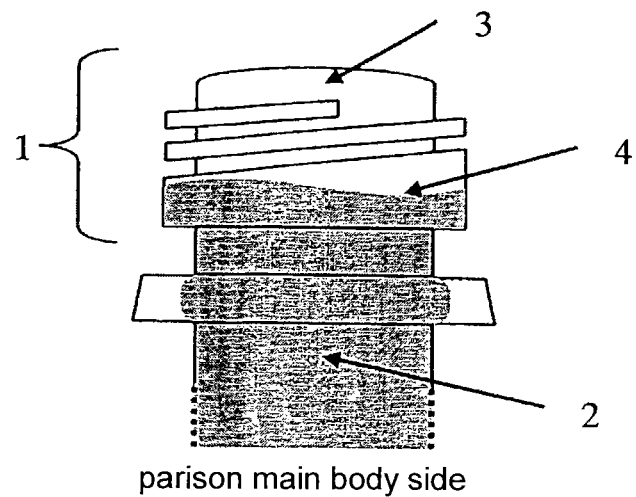
FIG. 5 is a schematic view showing part of a bottomed parison having a good leading edge.
Figure 6:
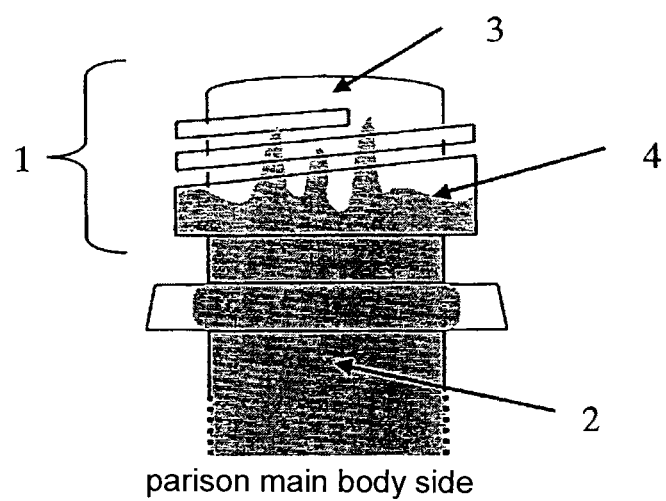
FIG. 6 is a schematic view showing part of a bottomed parison having a bad leading edge.

In addition, the use of the modified EVOH also improves the moldability of the container. It is possible to judge the moldability from the coloration of the appearance and the states of occurrence of gels and streaks in the bottomed parison and the state of the edge (hereinafter, may be referred to as a leading edge) of the resin composition layer containing the modified EVOH in the opening of a container. A schematic view showing part of a bottomed parison having a good leading edge and a schematic view showing part of a bottomed parison having a bad leading edge are shown in FIG. 5 and FIG. 6, respectively. In an opening 1 of the container, a boundary between a multilayer portion (resin composition layer/thermoplastic resin layer) 2 and a single layer portion (thermoplastic resin layer) 3 is a leading edge 4. A preferred state of the leading edge is a state where the line of the leading edge is approximately horizontal when the bottomed parison is placed with its bottom portion down.

As the thermoplastic resin other than the modified EVOH used for the thermoplastic resin layer of the coinjection stretch blow molded container, those described above as the thermoplastic resin other than the modified EVOH used for the multilayer structure are used. Among all, it is preferred to be at least one selected from the group consisting of polyester, polypropylene, and polyethylene.

As polyethylene used for the thermoplastic resin layers of the coinjection stretch blow molded container, it is preferred to use high density polyethylene.

As the polyester (hereinafter, may be abbreviated as PES) used for the thermoplastic resin layers of the coinjection stretch blow molded container, condensation polymers having aromatic dicarboxylic acids or alkyl esters thereof and diols as main components are used. In particular, in order to achieve the objects of the present invention, PES having ethylene terephthalate as the main component is preferred. Specifically, the total proportion (mol %) of the terephthalic acid unit and the ethylene glycol unit is preferably not less than 70 mol %, more preferably not less than 90 mol %, of the total number of moles of all the structural units of the PES. If the total proportion of the terephthalic acid unit and the ethylene glycol unit is less than 70 mol %, the PES to be obtained becomes amorphous, so that the mechanical strength is insufficient. In addition, when the PES is stretched and formed into a container and the contents are hot-filled in the container, the thermal shrinkage is so large that it may not be put in practical use. Moreover, when solid-phase polymerization is carried out to reduce oligomers contained in the resin, the softened resin tends to stick, which makes production difficult.

If necessary, the above PES may contain a bifunctional compound unit other than the terephthalic acid unit and the ethylene glycol unit within the range in which the above-described problems do not occur. The proportion (mol %) is preferably not more than 30 mol %, more preferably not more than 20 mol %, and even more preferably not more than 10 mol %, of the total number of moles of all the structural units of the PES. Such bifunctional compound unit may include a dicarboxylic acid unit, a diol unit, and a hydroxycarboxylic acid unit. Such bifunctional compound units may either be aliphatic, alicyclic, or aromatic bifunctional compound units. Specific examples thereof may include a neopentyl glycol unit, a cyclohexanedimethanol unit, a cyclohexanedicarboxylic acid unit, an isophthalic acid unit, and a naphthalene dicarboxylic acid unit.

Among these, an isophthalic acid unit is advantageous since the resultant PES provides a broad range of conditions under which good containers can be produced and provides excellent moldability. This results in an advantage of a lowered defective production rate. This is also advantageous in that the container may be prevented from whitening caused by a suppressed crystallization rate. Also preferred are a 1,4-cyclohexanedimethanol unit and 1,4-cyclohexanedicarboxylic acid unit because the container to be obtained has even better strength against dropping. Naphthalene dicarboxylic acid unit is also preferred in that the PES to be obtained has a higher glass transition temperature and the thermal resistance is improved, and the ability of absorbing ultraviolet radiation can be provided. This is especially useful when the content is susceptible to degradation by ultraviolet radiation. For example, this is particularly useful when the content is susceptible to degradation by both oxidation and ultraviolet radiation, such as beer.

In the case of using a polycondensation catalyst during the production of the PES, a catalyst generally used for production of PES may be used. Examples thereof include: antimony compounds such as antimony trioxide; germanium compounds such as germanium dioxide, germanium tetraethoxide, and germanium tetra-n-butoxide; titanium compounds such as titanium tetramethoxide, titanium tetraethoxide, titanium tetra-n-propoxide, titanium tetraisopropoxide, and titanium tetrabutoxide; and tin compounds such as di-n-butyltin dilaurate, di-n-butyltin oxide, and dibutyltin diacetate. These catalysts may be used alone or in combination of two or more. The amount of the polycondensation catalyst used is preferably 0.002 to 0.8% by weight based on the weight of dicarboxylic acid component.

Among these, antimony compounds are preferred in view of the cost of the catalyst, and antimony trioxide is especially preferred. On the other hand, germanium compounds are preferred in that the PES to be obtained has a good color tone, and germanium dioxide is especially preferred. In view of moldability, the germanium compounds are more preferred than the antimony compounds. The PES obtained by the polymerization reaction with an antimony compound as a catalyst has a higher crystallization rate than the case using a germanium compound as a catalyst. This means that in the case of using an antimony compound, crystallization tends to proceed easily by heating during injection molding or blow molding. The resultant containers are likely to generate whitening and may be poor in transparency. The degree of orientation by drawing may also be lowered, and the moldability may deteriorate. This narrows the range of conditions under which good products can be produced, which tends to increase the rate of production of defective products.

In particular, when polyethylene terephthalate containing no copolymerized component other than diethylene glycol units as a by-product is used as the PES used for the present invention, it is preferred to use a germanium compound as the catalyst to suppress the crystallization rate when producing the PES.

As the polypropylene for use as a thermoplastic resin other than the modified EVOH, in addition to homopolypropylene, random or block copolymers with another olefin compound such as ethylene may be used. Among them, copolymers with ethylene are preferred from the viewpoints of transparency and outer appearance of containers to be obtained. In addition, the melt index of the polypropylene is preferably 0.1 to 100 g/10 min. (at 230° C. under a load of 2160 g), more preferably 0.2 to 50 g/10 min., and even more preferably 0.5 to 20 g/10 min.

The coinjection stretch blow molded container of the present invention is a multilayer structure having at least each one layer of the resin composition layer containing the modified EVOH and the thermoplastic resin layer. Since such multilayer container is capable of obtaining high transparency and is extremely excellent in preservation performance of the quality of the contents, it is most appropriate for food packaging applications.

In the coinjection stretch blow molded container, it is preferred that the thermoplastic resin layers are arranged to directly make contact with the layer of the resin composition containing the modified EVOH. Since the resin composition has excellent adhesion to the thermoplastic resin other than the modified EVOH, separation due to impact does not easily occur even in a case of not using the adhesive resin layer. In addition, by such arrangement, higher transparency is obtained. In the present invention, layer constitution only having the resin composition layer and the thermoplastic resin layer is more preferred. Layer constitution having the thermoplastic resins on both sides of the resin composition layer is even more preferred. Specifically, when C denotes the resin composition layer and T denotes the thermoplastic resin layer, preferred layer constitution is exemplified by (outside) T/C/T (inside), (outside) T/C/T/C/T (inside), and the like. Here, (inside) means the inner layer side, that is, a layer on the side in contact with the contents.

The method for producing the coinjection stretch blow molded container is not particularly limited. In coinjection stretch blow molding, the container is produced by subjecting a parison obtained by coinjection molding to stretch blow molding.

In the coinjection molding, in general, the resins to constitute respective layers of the multilayer structure are guided into concentric nozzles from two or more injection cylinders and are injected into a single mold simultaneously or alternately at non-synchronized timings, and one clamping operation is performed for molding. For example, parisons are produced by, but not limited to, the following methods: (1) a thermoplastic resin other than the modified EVOH for the inner and outer layers is first injected, and then a resin composition containing the modified EVOH to be the intermediate layer is injected to obtain a molded container of a three-layer constitution of thermoplastic resin layer/resin composition layer/thermoplastic resin layer; or (2) the thermoplastic resin for the inner and outer layers is first injected, then the resin composition is injected while, at the same time, or after that, the thermoplastic resin is again injected to obtain a molded container of five-layer constitution of thermoplastic resin layer/resin composition layer/thermoplastic resin layer/resin composition layer/thermoplastic resin layer.

The resin composition containing the modified EVOH is preferably injected at a temperature in the range of 160 to 240° C., more preferably 175 to 230° C., and still more preferably 185 to 225° C. If the injection temperature is lower than 160° C., the resin composition is not sufficiently melted, and the molded products may have non-molten substances (fish eyes), and thus their appearance may be worsened. In some extreme cases, the screw torque may increase, so that the molding machine may have operational malfunctions. On the other hand, if the injection temperature exceeds 240° C., the molded products may be unfavorably colored and contain gelled materials, so that the appearance of the resulting molded products may be poor. Moreover, the fluidity of the melt becomes uneven or the flow is inhibited by a decomposition gas and the gelled materials, so that the resin composition layer thus obtained may have failed areas. In some extreme cases, the gelled materials may make it impossible to continue the injection molding operation. Further, in a case of using the PES as the thermoplastic resin other than the modified EVOH, oxidation of the PES proceeds and the gas barrier property of the resin composition may decrease. In order to suppress the progress of the oxidation during melting, it is also preferred to seal the supply hopper with nitrogen.

The conditions for injection molding of the thermoplastic resin other than the modified EVOH are adjusted appropriately in accordance with the kind of resin and the like. For example, the PES is preferably injected at a temperature in the range of 250 to 330° C., more preferably 270 to 320° C., even more preferably 280 to 310° C. If the injection temperature for PES is lower than 250° C., the PES is not sufficiently melted, and the molded products may have non-molten substances (fish eyes), by which their appearance may be worsened, moreover, which may cause the degradation of the mechanical strength of the molded products. In some extreme cases, the screw torque may increase, so that the molding machine may have operational malfunctions. In contrast, if the injection temperature for PES exceeds 330° C., PES may be highly decomposed, which may lead to a lowered molecular weight, so that the mechanical strength of the molded products may be lowered. Moreover, the PES decomposition gives off some vapors of acetaldehyde and the like, and thus the properties of the materials to be filled in the molded products may be worsened. Moreover, the oligomers resulting from the decomposition may contaminate the mold significantly, and the molded products may have a poor appearance.

In a case of coinjection molding using the resin composition containing the modified EVOH and the PES, the temperature of the hot runner parts through which these resins run is preferably in the range of 220 to 300° C., more preferably 240 to 280° C., and still more preferably 250 to 270° C. If the temperature of the hot runner parts is lower than 220° C., the PES may crystallize and solidify in the hot runner parts. If so, the molding operation will become difficult. In contrast, if the temperature of the hot runner parts exceeds 300° C., the oxidation of the PES proceeds so that the gas barrier properties of the resin composition layer may be degraded. In addition, the molded products may be unfavorably colored and contain gelled materials, so that the appearance of the molded products may be poor. Moreover, the fluidity of the melt is disordered or the flow is inhibited by the decomposition gas and by the gelled materials, so that the layer of the resin composition may have failed areas. In some extreme cases, the gelled materials may make it impossible to continue the injection molding operation.

In a case of coinjection molding using the resin composition containing the modified EVOH and the PES, the mold temperature is preferably in the range of 0 to 70° C., more preferably 5 to 50° C., and even more preferably 10 to 30° C. With this, the crystallization of the resin composition and the PES in the parisons thus obtained can be suppressed and their uniform stretchabilities are secured, so that multilayer containers thus obtained has even more improved delamination resistance and transparency and it is possible to obtain molded products having good shape retentivity. If the mold temperature is lower than 0° C., the dew formed around the mold may worsen the appearance of the parisons, and thus good molded products may not be obtained. On the other hand, if the mold temperature is higher than 70° C., the crystallization of the resin composition and the PES which constitute a parison will not be suppressed and the parison cannot be stretched uniformly. As a result, delamination resistance and transparency of a molded product obtained may decrease. Moreover, it will become difficult to obtain a molded article of an intended shape.

The total thickness of the parison thus obtained is preferably in the range of 2 to 5 mm, and the thickness of the resin composition layer is preferably in the range of 10 to 500 μm in total.

The above parison is directly in its high-temperature state, or after having been re-heated with heating means such as a block heater and an infrared heater, transferred to the next stretch blowing process. In the stretch blowing process, the heated parison is stretched longitudinally one- to five-fold, and thereafter blown one- to four-fold with compressed air or the like for stretch blow molding so that the coinjection stretch blow molded container of the present invention can be produced. The temperature of the parison is preferably 75 to 150° C., more preferably 85 to 140° C., even more preferably 90 to 130° C., and still more preferably 95 to 120° C. If the temperature of the parison exceeds 150° C., in a case of using PES as the thermoplastic resin other than the modified EVOH, the PES may easily crystallize, so that the resultant container may be whitened and its appearance may become poor. In addition, the delamination of the container may increase unfavorably. On the other hand, if the temperature of the parison is less than 75° C., in a case of using PES as the thermoplastic resin other than the modified EVOH, the PES may be crazed to be pearly, so that the transparency may be lost.

In a case of using polypropylene as the thermoplastic resin other than the modified EVOH, the molding temperature of the polypropylene is preferably within the range of 180 to 250° C., and more preferably 200 to 250° C., from the viewpoint of fluidity of the polypropylene on melting as well as the appearance and strength of a container to be obtained. The production conditions employed for producing the multilayer parison and the production conditions employed for the stretch blow molding of the multilayer parison are the same as those for the case of producing a coinjection blow molded container using the resin composition and the PES previously described.

The total thickness of the body part of the thus obtained multilayer container is generally 100 to 2000 μm, preferably 150 to 1000 μm, and may vary depending on the use of the container. In this case, the total thickness of the resin composition layer is preferably in the range of 2 to 200 μm, more preferably 5 to 100 μm.

In the manner described above, a coinjection stretch blow molded container of the present invention is excellent in impact resistance, barrier property, and transparency and also excellent in productivity. The containers are therefore useful for various packaging containers, such as food packaging containers, medical product packaging containers, industrial chemical packaging containers, and agrochemical packaging containers. Among all, containers using PES as the thermoplastic resin other than the modified EVOH has extremely excellent transparency and barrier property, so that they are extremely useful as containers for beverages such as beer. Meanwhile, containers using polypropylene as the thermoplastic resin has extremely excellent flavor retention, organic solvent resistance, and delamination resistance. Accordingly, such container is suitable for storing various contents for a long time, and is useful as a container for storing various beverages such as customarily hot-filled black tea, foods, cosmetics, blood samples, and the like.

A fuel container comprising a layer of the resin composition containing the modified EVOH of the present invention is also a preferred embodiment of the present invention. By using such layer of the resin composition containing the modified EVOH, the fuel container has excellent impact resistance and fuel barrier property and also is excellent in secondary processability, and in addition, allowed to be produced at low cost. Descriptions are given below to the fuel container.

The fuel container is obtained by molding the resin composition containing the modified EVOH. The fuel container may be a monolayer container only of a layer of the resin composition, and further, may also be a multilayer container in which layers of other materials are laminated. In order to further enhance the mechanical strength and the fuel barrier property, a multilayer container is preferred. It is preferred that the fuel container is a multilayer container having the resin composition layer and a layer of a thermoplastic resin other than the modified EVOH.

On a case of laminating the resin composition layer and the thermoplastic resin layer, it is preferred that an adhesive resin layer is arranged between both layers. Although the multilayer container is allowed to have the thermoplastic resin layer arranged only on one side of the resin composition layer, is preferred that an intermediate layer is the resin composition layer and inner and outer layers of a thermoplastic resin other than the modified EVOH are arranged on both sides thereof via adhesive resin layers.

As the thermoplastic resin used for the thermoplastic resin layers of the fuel container, those described above as the thermoplastic resin other than the modified EVOH used for the multilayer structure are used. Among all, polyolefin is preferred. In this case, the above effects obtained by making into a multilayer are particularly excellent. Further, not only in the usual conditions, a fuel barrier property at high humidity also improves.

Among all, high density polyethylene is used particularly preferably. The high density polyethylene in the present invention is obtained by a low pressure method or a medium pressure method using, for example, a Ziegler catalyst and has a density of not less than 0.93 g/cm$^3$ and preferably not less than 0.94 g/cm$^3$. The density is usually not more than 0.965 g/cm$^3$. A preferred melt index (MI) (value measured at 190° C., under a load of 2160 g) of the high density polyethylene in the present invention is from 0.001 to 0.6 g/10 min. and preferably from 0.005 to 0.1 g/10 min.

By laminating such high density polyethylene layer on one side or both sides of the resin composition layer, it is possible to obtain a fuel container having even more excellent impact resistance and fuel barrier property. It is a preferred embodiment that the high density polyethylene layer is in an innermost layer or is in an innermost layer and an outermost layer.

Although the resin used for the adhesive resin layer of the fuel container is not particularly limited, it is preferred to use polyurethane-based or polyester-based, one-component or two-component curing adhesives; or polyolefins containing a carboxyl group, a carboxylic anhydride group, or an epoxy group. Among all, the latter is more preferred in view of excellence in both adhesion to the modified EVOH and also adhesion to those not containing a carboxyl group, a carboxylic anhydride group, or an epoxy group among the thermoplastic resins other than the modified EVOH.

As polyolefin containing a carboxyl group, those described above as the adhesive resin used for the multilayer structure are used.

The fuel container is allowed to further have a regrind layer containing the modified EVOH and the thermoplastic resin other than the modified EVOH (hereinafter, may be abbreviated as a regrind layer). Here, the regrind may include lost portions from molding generated in producing a molded article, ground products of scraps after being used by general consumers, and the like. The regrind content in the layer is usually not less than 50 weight % and preferably not less than 75 weight %. The modified EVOH content in the regrind layer is less than 50 weight % and preferably not more than 20 weight %. The modified EVOH contained in the regrind layer is derived from the regrind.

When T denotes the thermoplastic resin layer, AD denotes the adhesive resin layer, and REG denotes the regrind layer, the following layer constitution may be included as examples.

Three layers: resin composition layer/AD/T;
Four layers: resin composition layer/AD/REG/T, resin composition layer/AD/T/REG;
Five layers: T/AD/resin composition layer/AD/T, REG/AD/resin composition layer/AD/T, T/AD/resin composition layer/AD/REG;
Six layers: T/REG/AD/resin composition layer/AD/T, REG/T/AD/resin composition layer/AD/T, T/REG/AD/resin composition layer/AD/REG, REG/T/AD/resin composition layer/AD/REG;
Seven layers: T/REG/AD/resin composition layer/AD/REG/T, T/REG/AD/resin composition layer/AD/T/REG, REG/T/AD/resin composition layer/AD/T/REG, REG/T/AD/resin composition layer/AD/REG/T.

The layer constitution is not limited to the above. Among them, preferred layer constitution may include T/AD/resin composition layer/AD/T, T/REG/AD/resin composition layer/AD/T, and the like.

Although the thickness of each of the layers is not particularly limited, the total thickness of the thermoplastic resin layer is preferably from 300 to 10000 μm, more preferably from 500 to 8000 μm, and even more preferably from 800 to 6000 μm. The total thickness of the adhesive resin layer is preferably from 5 to 1000 μm, more preferably from 10 to 500 μm, and even more preferably from 20 to 300 μm. The total thickness of the resin composition layer is preferably from 5 to 1000 μm, more preferably from 20 to 800 μm, and even more preferably from 50 to 600 μm. In addition, the entire thickness is preferably from 300 to 12000 μm, more preferably from 500 to 8500 μm, and even more preferably from 1000 to 7000 μm. These thicknesses mean average thicknesses of the body part of the fuel container. When the entire thickness is too large, the weight becomes too much, which affects fuel consumption of automobiles and the like and increases the costs for the fuel container. In contrast, when the entire thickness is too small, there is a problem that the rigidity is not kept and it turns out to be easily broken. Accordingly, it is important to set a thickness corresponding to the capacity and the applications.

It is also possible to blend various additives in each layer forming the multilayer container in the present invention. Such additives may include antioxidants, plasticizers, heat stabilizers, ultraviolet absorbers, antistatic agents, lubricants, colorants, fillers, and the like, and may specifically include those mentioned above as ones allowed to be added to the resin composition.

The method of molding the fuel container is not particularly limited. For example, it may include molding methods performed in the field of general polyolefin, such as extrusion molding, blow molding, injection molding, and thermoforming, for example. Among all, blow molding and thermoforming are preferred, and coextrusion blow molding and coextrusion sheet thermoforming are particularly preferred.

To date, in a case of producing a fuel container by coextrusion blow molding or coextrusion sheet thermoforming, there have been cases that a spreading effect is exerted on the EVOH layer usually used for an intermediate layer during secondary processing into a container shape and thus the thickness of the EVOH layer in the container does not become uniform. In particular, in a case that a necking phenomenon occurs in the EVOH layer at a corner or the like of the container, the thickness of the EVOH layer in that area becomes considerably thin relative to the average value of the EVOH layer thickness of the entire container and there have been cases of decreasing the barrier property of the entire container. Regarding this phenomenon, barrier lowering associated with reduction in the EVOH thickness at a corner often becomes significant particularly in a case of coextrusion sheet thermoforming. Since the resin composition containing the modified EVOH of the present invention is excellent in flexibility and stretchability, it is excellent in secondary processability so that it is possible to reduce such problems. Accordingly, there are great practical benefits to have the constitution of the present invention in a case of molding a fuel container by coextrusion blow molding or coextrusion sheet thermoforming.

In a case of producing a multilayer container by blow molding, although it is possible to employ either method of coinjection blow molding and coextrusion blow molding, coextrusion blow molding is preferred that easily handles complex container shapes. In coextrusion blow molding, a multilayer parison is formed by melt extrusion and the parison is sandwiched by a pair of blow molding molds. At this time, the parison is bitten off with the molds and also the facing bitten portions are fused. Subsequently, the parison is expanded in the molds to be molded in a container shape. In a case of molding a large container, such as a fuel container for automobiles, the parison is welded when sandwiched by the molds while often not bitten off. In that case, after expanding the parison, the areas sticking out of the container surface are often cut with a cutter or the like at an arbitrary height.

In addition, the mold temperature for blow molding the fuel container is preferably from 5 to 30° C., more preferably from 10 to 30° C., and even more preferably from 10 to 20° C. In a case of the mold temperature of less than 5° C., the dew is easily formed on the mold surface and there is a risk that a molded article thus obtained has poor appearance. In addition, in a case of the mold temperature of more than 30° C., there is a risk that the productivity decreases because the cooling time after molding becomes longer, and in a case that the molded article is not cooled sufficiently, there is a risk of generating a strain.

In addition, in a case of producing by thermoforming, after obtaining a thermoforming sheet by thermoforming a sheet having the resin composition layer, two edges of the thermoforming sheet are heat sealed with each other to join them and thus a fuel container is produced. At this time, it is possible to produce a multilayer container by using a multilayer sheet having the resin composition layer.

A method of preparing the thermoforming multilayer sheet is not particularly limited, and a sheet is prepared in a molding method performed in the field of general polyolefin and the like and the multilayer sheet thus obtained is thermoformed to obtain a thermoforming sheet. For the thermoforming method at this time, the methods described above as the method of molding a thermoformed article are employed. The molding temperature is not particularly limited, and it is adjusted appropriately depending on the constitution of the multilayer sheet. For example, the molding temperature is preferably from 130 to 200° C., more preferably from 135 to 195° C., and even more preferably from 140 to 190° C. For a method of producing the multilayer sheet, it is possible to employ, for example, T die molding, coextrusion molding, dry lamination molding, and the like, and coextrusion molding is particularly preferred.

From the perspective of improving the thermoforming workability, it is preferred that the thermoforming is carried out in conditions to make the heat sealed portion somewhat larger, and after the thermoforming, unnecessary portions are cut with a cutter or the like. An upper bottom surface and a lower bottom surface of the thermoforming sheet thus obtained are joined by heat sealing the edges of the thermoforming sheet with each other and thus the fuel container is obtained.

To the molded article thus obtained and the container precursor, such as a parison and a sheet during molding, crosslinking by radiation exposure and the like may also be applied.

A fuel container in the present invention means a fuel container mounted in automobiles, motorbikes, vessels, aircrafts, generators, and industrial and agricultural equipment, a portable container to feed fuel to these fuel containers, and further a container to store fuel used for driving them. Although the fuel may include, as representative examples, regular gasoline, gasoline having methanol, ethanol, toluene, MTBE, and the like blended therein, and biodiesel fuel, it is also exemplified by other heavy oil, light oil, heating oil, and the like.

EXAMPLES

Although further detailed descriptions are given below to the present invention by Examples, the present invention is not limited to Examples.

Example 1

(1) Synthesis of Modified EVAc

To a 50 L pressure reaction vessel provided with a jacket, a stirrer, a nitrogen inlet, an ethylene inlet, and an initiator addition port, 21 kg of vinyl acetate ($R^5$ is a methyl group in the formula (II): hereinafter, referred to as VAc), 2.1 kg of methanol (hereinafter, may be referred to as MeOH), and 1.1 kg of 2-methylene-1,3-propanediol diacetate ($R^1$, $R^2$, $R^3$, and $R^4$ are hydrogen atoms and $R^6$ and $R^7$ are methyl groups in the formula (III): hereinafter, referred to as MPDAc) were charged, and the temperature was raised to 60° C., and after that, nitrogen bubbling was carried out for 30 minutes to purge inside the reaction vessel with nitrogen. Subsequently, ethylene was introduced to have a reaction vessel pressure (ethylene pressure) of 4.2 MPa. After the temperature in the reaction vessel is adjusted at 60° C., 16.8 g of 2,2'-azobis (2,4-dimethylvaleronitrile) ("V-65" produced by Wako Pure Chemical Industries, Ltd.) as an initiator was added in the form of methanol solution to initiate polymerization. During the polymerization, the ethylene pressure was maintained at 4.2 MPa and the polymerization temperature at 60° C. After 4.5 hours, when the conversion of VAc became 34%, the polymerization was stopped by cooling. After removing ethylene by opening the reaction vessel, a nitrogen gas was bubbled to completely remove ethylene. Subsequently, after unreacted VAc was removed under reduced pressure, MeOH was added to the modified ethylene-vinyl acetate copolymer (herein, may be referred to as modified EVAc) to which a structural unit derived from MPDAc was introduced by copolymerization to have a 20 mass % MeOH solution.

(2) Saponification of Modified EVAc

To a 10 L reaction vessel provided with a jacket, a stirrer, a nitrogen inlet, a reflux condenser, and a solution addition port, 4715 g of a 20 mass % MeOH solution of the modified EVAc obtained in (1) was charged. The temperature was raised to 60° C. while blowing nitrogen into the solution, and a MeOH solution having a sodium hydroxide concentration of 2 N was added for two hours at a rate of 14.7 mL/min. After completion of adding the MeOH sodium hydroxide solution, saponification reaction proceeded by stirring for two hours while keeping the temperature in the system at 60° C. After that, 254 g of acetic acid was added to stop the saponification reaction. After that, while heating and stirring at 80° C., 3 L of ion exchange water was added to drain MeOH outside the reaction vessel and to precipitate modified EVOH. The precipitated modified EVOH was collected by decantation and ground with a mixer. The modified EVOH powder thus obtained was added in a 1 g/L aqueous acetic acid solution (bath ratio of 20:proportion of 1 kg of the powder to 20 L of the aqueous solution) and it was stirred and washed for two hours. It was drained and was further casted in a 1 g/L aqueous acetic acid solution (bath ratio of 20) and it was stirred and washed for two hours. An operation of casting one obtained by deliquoring it in ion exchange water (bath ratio of 20) for stirring and washing for two hours and deliquoring it was repeated three times to carry out refinement. Subsequently, it was stirred and immersed in 10 L of an aqueous solution containing 0.5 g/L of acetic acid and 0.1 g/L of sodium acetate for four hours and then deliquored, and it was dried at 60° C. for 16 hours to obtain 503 g of roughly dried modified EVOH.

(3) Production of Modified EVOH Hydrous Pellet

To a 3 L stirring vessel provided with a jacket, a stirrer, and a reflux condenser, 758 g of the roughly dried modified EVOH obtained by repeating (2) twice, 398 g of water, and 739 g of MeOH were charged and the temperature was raised to 85° C. for dissolution. The solution was extruded in a liquid mixture of water/MeOH=90/10 cooled at 5° C. through a glass tube having a diameter of 4 mm to be precipitated in the form of strand, and the strand was cut with a strand cutter into pellets to obtain modified EVOH hydrous pellets. The moisture content of the modified EVOH hydrous pellets thus obtained was measured by a halogen moisture meter "HR 73" manufactured by Mettler and it was 55 mass %.

(4) Production of Modified EVOH Composition Pellet

In a 1 g/L aqueous acetic acid solution (bath ratio of 20), 1577 g of the modified EVOH hydrous pellets obtained in (3) above was added and it was stirred and washed for two hours. It was drained and was further added in a 1 g/L aqueous acetic acid solution (bath ratio of 20) and it was stirred and washed for two hours. After deliquoring, the aqueous acetic acid solution was renewed and same operation was carried out. An operation of casting one, obtained by washing with the aqueous acetic acid solution and then draining it, in ion exchange water (bath ratio of 20) for stirring and washing for two hours and deliquoring it was repeated three times to carry out purification, and thus modified EVOH hydrous pellets from which the catalyst residue during the saponification reaction was removed were obtained. The hydrous pellets were added in an aqueous solution (bath ratio of 20) having a concentration of sodium acetate of 0.525 g/L, an acetic acid concentration of 0.8 g/L, and a phosphoric acid concentration of 0.007 g/L for immersion for four hours while periodically stirred. They were drained and dried at 80° C. for three hours and at 105° C. for 16 hours, thereby obtaining modified EVOH composition pellets containing acetic acid, sodium salt, and a phosphoric acid compound.

(5) Content of Each Structural Unit in Modified EVAc

In the modified EVAc, the content of ethylene units (a mol % in the formula (IV)), the content of structural units derived from vinyl acetate (b mol % in the formula (IV)), and the content of structural units derived from MPDAc (c mol % in the formula (IV)) were calculated by $^1$H-NMR measurement of the modified EVAc before saponification.

Firstly, a small amount of the MeOH solution of modified EVAc obtained in (1) was sampled and modified EVAc was precipitated in ion exchange water. The precipitate was collected and dried at 60° C. under vacuum, and thus dried modified EVAc was obtained. Next, the dried modified EVAc thus obtained was dissolved in dimethyl sulfoxide (DMSO)-$d_6$ containing tetramethylsilane as the internal standard material and measured at 80° C. using 500 MHz $^1$H-NMR ("GX-500" manufactured by JEOL Ltd.).

FIG. 1 illustrates a $^1$H-NMR spectrum of a modified EVAc obtained in Example 1. Each peak in the spectrum is assigned as follows:

from 0.6 to 1.0 ppm: methylene proton (4H) in a terminal region of ethylene unit;

from 1.0 to 1.85 ppm: methylene proton (4H) in an intermediate region of ethylene unit, methylene proton (2H) in main chain of structural unit derived from MPDAc, methylene proton (2H) of vinyl acetate unit;

from 1.85 to 2.1 ppm: methyl proton (6H) of structural unit derived from MPDAc and methyl proton (3H) of vinyl acetate unit;

from 3.7 to 4.1 ppm: methylene proton (4H) in side chain of structural unit derived from MPDAc;

from 4.4 to 5.3 ppm: methine proton (1H) of vinyl acetate unit.

In accordance with the above assignment, where the integral value of from 0.6 to 1.0 ppm is x, the integral value of from 1.0 to 1.85 ppm is y, the integral value of from 3.7 to 4.1 ppm is z, and the integral value of from 4.4 to 5.3 ppm is w, the ethylene unit content (a: mol %), the vinyl ester unit content (b: mol %), and the content of structural units derived from MPDAc (c: mol %) are calculated according to the following formulae, respectively.

$$a=(2x+2y-z-4w)/(2x+2y+z+4w)\times 100$$

$$b=8w/(2x+2y+z+4w)\times 100$$

$$c=2z/(2x+2y+z+4w)\times 100$$

As a result of calculating in the above method, the ethylene unit content (a) was 32.0 mol %, the vinyl ester unit content (b) was 64.1 mol %, the content (c) of structural units derived from MPDAc was 3.9 mol %. The values of a, b, and c in the modified EVAc were same as the values of a, b, and c in the modified EVOH after saponification treatment.

(6) Degree of Saponification of Modified EVOH

Figure 2:
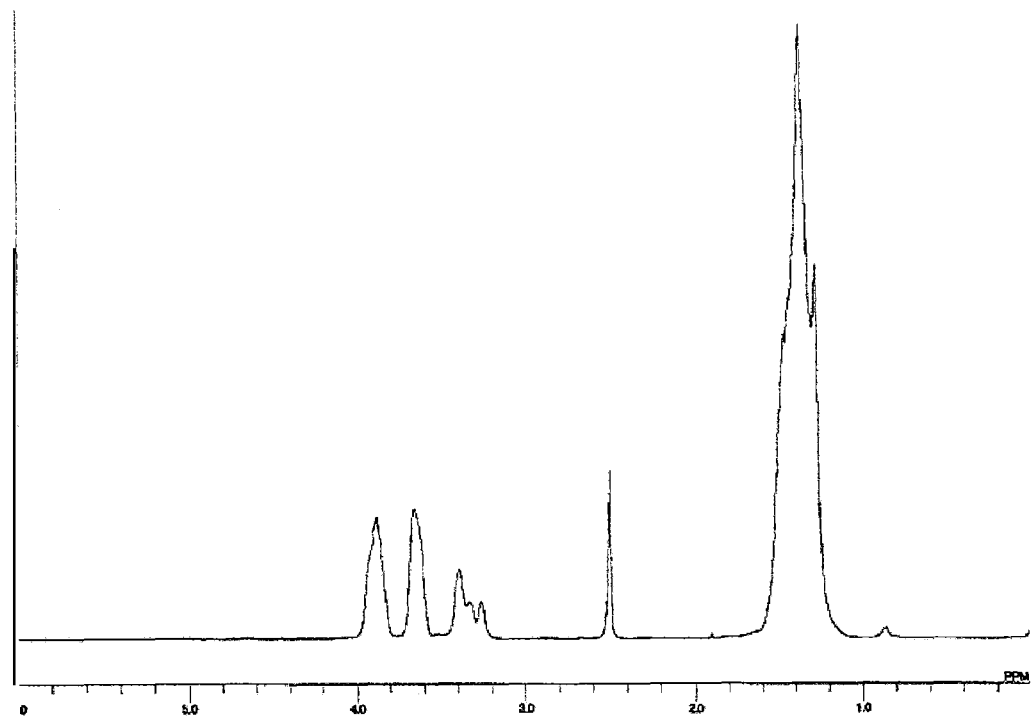
FIG. 2 is a $^1$H-NMR spectrum of a modified ethylene-vinyl alcohol copolymer obtained in Example 1.

The modified EVOH after saponification was also subjected to $^1$H-NMR measurement similarly. The roughly dried modified EVOH obtained in (2) above was dissolved in dimethyl sulfoxide (DMSO)-$d_6$ containing tetramethylsilane as the internal standard material and tetrafluoroacetic acid (TFA) as an additive and measured at 80° C. using 500 MHz $^1$H-NMR ("GX-500" manufactured by JEOL Ltd.). FIG. 2 illustrates a $^1$H-NMR spectrum of a modified EVOH obtained in Example 1. Since the peak intensity of from 1.85 to 2.1 ppm decreased drastically, it is clear that the ester group contained in the structural units derived from MPDAc, in addition to the ester group contained in vinyl acetate, was also saponified to be hydroxyl group. The degree of saponification was calculated from the peak intensity ratio of the methyl proton of vinyl acetate unit (from 1.85 to 2.1 ppm) and the methine proton of vinyl alcohol unit (from 3.15 to 4.15 ppm). The degree of saponification of modified EVOH was not less than 99.9 mol %.

(7) Melting Point of Modified EVOH

Measurement of the modified EVOH composition pellets obtained in (4) above was performed according to JIS K7121 by raising the temperature from 30° C. to 215° C. at a rate of 10° C./min., and after that, rapidly cooling it to −35°

C. at 100° C./min., and again from −35° C. to 195° C. at a rate of temperature rise of 10° C./min. (differential scanning calorimeter (DSC) "RDC220/SSC5200H" manufactured by Seiko Instruments & Electronics Ltd.). For temperature calibration, indium and lead were used. The peak melting temperature (Tpm) was obtained from the 2nd-run chart in accordance with the JIS above to define it as the melting point of modified EVOH. The melting point was 151° C.

(8) Sodium Salt Content and Phosphoric Acid Compound Content in Modified EVOH Composition In a teflon(registered trademark) pressure vessel, 0.5 g of the modified EVOH composition pellets obtained in (4) above was placed and 5 mL of concentrated nitric acid was added there for decomposition at room temperature for 30 minutes. After 30 minutes, the lid was closed for decomposition by heating at 150° C. for ten minutes and subsequently at 180° C. for five minutes with a wet digestion apparatus ("MWS-2" manufactured by Actac Corp.), and after that, it was cooled to room temperature. The process liquid was poured into a 50 mL measuring flask (made of TPX) and diluted with pure water. With this solution, analysis of contained metal was carried out by an ICP emission spectrophotometer ("OPTIMA4300DV" manufactured by Perkin-Elmer Inc.) and the contents of sodium elements and phosphorus elements were obtained. The sodium salt content was 150 ppm in terms of sodium elements, and the phosphoric acid compound content was 10 ppm in terms of phosphate radicals.

(9) Preparation of Film

Using the modified EVOH composition pellets obtained in (4) above, monolayer film formation was carried out using a 20 mm extruder "D2020" (D (mm)=20, L/D=20, compression ratio=2.0, screw: full flight) manufactured by Toyo Seiki Seisaku-Sho, Ltd. in the conditions below to obtain a monolayer film of the modified EVOH composition.

Cylinder temperature: supply area at 175° C., compression area at 190° C., measurement area at 190° C.

Die temperature: 190° C.

Screw rotation speed: from 40 to 100 rpm

Amount of discharge: from 0.4 to 1.5 kg/hour

Drawing roll temperature: 80° C.

Drawing roll speed: from 0.8 to 3.2 m/min.

Film thickness: from 20 to 150 μm

In other Examples herein, in accordance with the melting point of modified EVOH, temperature conditions of the extruder were set as follows.

Cylinder Temperature:

Supply area: 175° C.

Compression area: melting point of modified EVOH+30 to 45° C.

Measurement area: melting point of modified EVOH+30 to 45° C.

Die temperature: melting point of modified EVOH+30 to 45° C.

(10) Measurement of Young's Modulus

The monolayer film obtained in (9) above having a thickness of 20 μm was moisture conditioned in the conditions of 23° C. and 50% RH for three days to use it as a specimen, and Young's modulus measurement in the MD direction was carried out in a condition of a tensile speed of 5 mm/min by an Autograph ("AGS-H" manufactured by Shimadzu Corp.) according to ASTM D-638 to make it an index of flexibility. Measurement was carried out for each ten samples and to obtain an average value of them. The Young's modulus was 1.3 GPa.

(11) Viscoelasticity Measurement

The monolayer film having a thickness of 150 μm obtained in (9) above was vacuum dried at 40° C. to use it as a specimen, and viscoelasticity in the MD direction was measured by a dynamic viscoelasticity measuring instrument "Rheogel-E4000" manufactured by UBM Co., Ltd. A film piece having a width of 5 mm and a thickness of 150 μm was excited in a condition of a frequency of 11 Hz and the temperature was raised from −120° C. at a rate of temperature rise of 3° C./min. Storage modulus at 80° C. (E') was 0.10 MPa.

(12) Stretch Test

The monolayer film having a thickness of 150 μm obtained in (9) above was put in a pantograph type biaxial stretching machine manufactured by Toyo Seiki Seisaku-Sho, Ltd. to carry out simultaneous biaxial stretching at 80° C. at a draw ratio of from 2×2 time to 4×4 time. The greatest draw ratio at which the film was able to be stretched with no unevenness and no local thickness deviation without being broken was defined as a maximum draw ratio. As a result, even at a draw ratio of 4.0×4.0 time, it was able to be stretched with no unevenness and no local thickness deviation.

(13) Measurement of Oxygen Transmission Rate

The monolayer film having a thickness of 20 μm obtained in (9) above was moisture conditioned in the conditions at 20° C. and 85% RH for three days, and after that, measurement ("OX-TORAN MODEL 2/21" manufactured by MOCON, Inc.) of the oxygen transmission rate was carried out in the same conditions. As a result, the oxygen transmission rate (OTR) was 4.5 cc·20 μm/m²·day·atm.

Example 2

Polymerization was carried out in a same method other than, in Example 1 (1), changing the amount of the initiator to 8.4 g and changing the amount of charging MPDAc to 0.92 kg. After five hours, when the conversion of VAc became 35%, the polymerization was stopped by cooling. Continuously, in a same manner as Example 1, modified EVOH was synthesized and the results of evaluation are shown collectively in Table 1.

Example 3

Polymerization was carried out in a same method other than, in Example 1 (1), changing the ethylene pressure to 4.1 MPa and adding 1.5 kg of 2-methylene-1,3-propanediol instead of MPDAc. After five hours, when the conversion of VAc became 28%, the polymerization was stopped by cooling. Continuously, in a same manner as Example 1, modified EVOH was synthesized and the results of evaluation are shown collectively in Table 1.

Example 4

Polymerization was carried out in a same method other than, in Example 1 (1), changing the amount of the initiator to 8.4 g and changing the amount of charging MPDAc to 0.5 kg. After six hours, when the conversion of VAc became 52%, the polymerization was stopped by cooling. Continuously, in a same manner as Example 1, modified EVOH was synthesized and the results of evaluation are shown collectively in Table 1.

Example 5

Polymerization was carried out in a same method other than, in Example 1 (1), changing the amount of MeOH to 6.3 kg, changing the ethylene pressure to 3.8 MPa, changing the amount of the initiator to 8.4 g, and changing the amount of charging MPDAc to 98 g. After four hours, when the conversion of VAc became 47%, the polymerization was stopped by cooling. Continuously, in a same manner as Example 1, modified EVOH was synthesized and the results of evaluation are shown collectively in Table 1.

Example 6

In a same manner as Example 4, modified EVAc was synthesized to obtain a methanol solution of modified EVAc. Continuously, saponification treatment was carried out in a same method as Example 1 (2) other than adding the MeOH solution of sodium hydroxide at a rate of 3.7 mL/min. Results of evaluating the modified EVOH thus obtained are shown collectively in Table 1.

Example 7

Polymerization was carried out in a same method other than, in Example 1 (1), changing the amount of MeOH to 1.1 kg, changing the ethylene pressure to 3.8 MPa, changing the amount of charging MPDAc to 2.0 kg, and adding 16.8 g of the initiator after five hours from initiation of the polymerization. After ten hours, when the conversion of VAc became 9%, the polymerization was stopped by cooling. Continuously, in a same manner as Example 1, modified EVOH was synthesized and the results of evaluation are shown collectively in Table 1.

Example 8

Polymerization was carried out in a same method other than, in Example 1 (1), changing the amount of MeOH to 2.5 kg, changing the amount of the initiator to 8.4 g, changing the ethylene pressure to 3.4 MPa, and changing the amount of charging MPDAc to 0.77 kg. After four hours, when the conversion of VAc became 32%, the polymerization was stopped by cooling. Continuously, in a same manner as Example 1, modified EVOH was synthesized and the results of evaluation are shown collectively in Table 1.

Example 9

Polymerization was carried out in a same method other than, in Example 1 (1), changing the amount of MeOH to 1.1 kg, changing the amount of the initiator to 16.8 g, changing the ethylene pressure to 6.0 MPa, and changing the amount of charging MPDAc to 1.1 kg. After four hours, when the conversion of VAc became 22%, the polymerization was stopped by cooling. Continuously, in a same manner as Example 1, modified EVOH was synthesized and the results of evaluation are shown collectively in Table 1.

Example 10

Polymerization was carried out in a same method other than, in Example 1 (1), changing the amount of the initiator to 16.8 g, changing the ethylene pressure to 5.8 MPa, and changing the amount of charging MPDAc to 0.34 kg. After three hours, when the conversion of VAc became 28%, the polymerization was stopped by cooling. Continuously, in a same manner as Example 1, modified EVOH was synthesized and the results of evaluation are shown collectively in Table 1.

Comparative Example 1

Polymerization was carried out in a same method other than, in Example 1 (1), changing the amount of MeOH to 6.3 kg, changing the ethylene pressure to 3.7 MPa, changing the amount of the initiator to 4.2 g, and not charging the MPDAc to obtain unmodified EVAc. After four hours, when the conversion of VAc became 44%, the polymerization was stopped by cooling. Continuously, in a same manner as Example 1, the unmodified EVOH was synthesized and the results of evaluation are shown collectively in Table 1.

Comparative Example 2

Polymerization was carried out in a same method other than, in Example 1 (1), changing the amount of MeOH to 6.3 kg, changing the amount of the initiator to 4.2 g, changing the ethylene pressure to 2.9 MPa, and not adding the MPDAc to obtain unmodified EVAc. After four hours, when the the conversion of VAc became 50%, the polymerization was stopped by cooling. Continuously, in a same manner as Example 1, the unmodified EVOH was synthesized and the results of evaluation are shown collectively in Table 1.

Comparative Example 3

Polymerization was carried out in a same method other than, in Example 1 (1), changing the amount of MeOH to 4.2 kg, changing the amount of the initiator to 4.2 g, changing the ethylene pressure to 5.3 MPa, and not adding the MPDAc to obtain unmodified EVAc. After three hours, when the conversion of VAc became 29.3%, the polymerization was stopped by cooling. Continuously, in a same manner as Example 1, the unmodified EVOH was synthesized and the results of evaluation are shown collectively in Table 1.

Comparative Example 4

In a same manner as Comparative Example 1, unmodified EVAc was synthesized to obtain a methanol solution of EVAc. Continuously, saponification treatment was carried out in a same method as Example 1 (2) other than adding the MeOH solution of sodium hydroxide at a rate of 2.2 mL/min. Results of evaluating the unmodified EVOH thus obtained are shown collectively in Table 1.

TABLE 1

|  | Ethylene Content mol % | MPDAc Content mol % | Degree of Saponification mol % | Melting Point ° C. | Young's Modulus GPa | E' GPa | Maximum Draw Ratio time | Oxygen Transmission Rate *1) |
|---|---|---|---|---|---|---|---|---|
| Example 1 | 32 | 3.9 | ≥99.9 | 151 | 1.3 | 0.10 | 4.00 | 4.5 |
| Example 2 | 32 | 3.1 | ≥99.9 | 158 | 1.6 | 0.12 | 3.50 | 3.4 |
| Example 3 | 32 | 3.0 *2) | ≥99.9 | 157 | 1.6 | 0.12 | 3.50 | 3.6 |
| Example 4 | 32 | 1.4 | ≥99.9 | 173 | 1.8 | 0.31 | 3.25 | 3.2 |
| Example 5 | 32 | 0.4 | ≥99.9 | 180 | 2.0 | 0.60 | 3.00 | 2.0 |
| Example 6 | 32 | 1.4 | 98.9 | 168 | 1.5 | 0.13 | 3.50 | 7.2 |
| Example 7 | 27 | 8.0 | ≥99.9 | 125 | 1.0 | 0.09 | 4.00 | 12.0 |
| Example 8 | 27 | 3.0 | ≥99.9 | 166 | 2.4 | 0.21 | 3.00 | 3.0 |

TABLE 1-continued

|  | Ethylene Content mol % | MPDAc Content mol % | Degree of Saponification mol % | Melting Point ° C. | Young's Modulus GPa | E' GPa | Maximum Draw Ratio time | Oxygen Transmission Rate *1) |
|---|---|---|---|---|---|---|---|---|
| Example 9 | 44 | 3.0 | ≥99.9 | 134 | 0.6 | 0.10 | 4.00 | 5.0 |
| Example 10 | 44 | 1.0 | ≥99.9 | 152 | 1.1 | 0.15 | 3.50 | 4.5 |
| Comparative Example 1 | 32 | 0 | ≥99.9 | 183 | 2.5 | 0.69 | 2.00 | 1.3 |
| Comparative Example 2 | 27 | 0 | ≥99.9 | 191 | 3.5 | 0.89 | *3) | 1.2 |
| Comparative Example 3 | 44 | 0 | ≥99.9 | 165 | 1.5 | 0.51 | 2.50 | 3.8 |
| Comparative Example 4 | 32 | 0 | 97.0 | 158 | 1.6 | 0.14 | 3.50 | 9.0 |

*1) cc · 20 μm/m² · day · atm
*2) 2-methylene-1,3-propanediol
*3) Broken in stretch test of 2 × 2 time.

Example 11

(2-1) Production of Multilayer Sheet

A multilayer sheet (polypropylene/adhesive resin/barrier material/adhesive resin/polypropylene) was produced by use of a three-materials five-layer coextrusion machine using the modified EVOH composition pellets prepared in Example 1 as a barrier material. The layer constitution of the sheet included 420 μm of the polypropylene resin ("E-203B" produced by Idemitsu Petrochemical Co., Ltd.) of the inner and outer layers, 40 μm each of the adhesive resin ("Admer QF551" produced by Mitsui Chemicals, Inc.), and 80 μm of the barrier material of the intermediate layer.

(2-2) Production of Molded Container

A thermoformed container was obtained by thermoforming the multilayer sheet obtained in (2-1) above by use of a thermoforming machine (a vacuum-pressure deep drawing molding machine "model FX-0431-3" manufactured by Asano Laboratories Co., Ltd.) into a shape of a round cup (mold shape: upper part 75 mmϕ, lower part 60 mmϕ, depth 75 mm, drawn ratio S=1.0) at a sheet temperature of 160° C. using compressed air (pressure: 5 kgf/cm²). The molding conditions are as follows.

Temperature of heater: 400° C.
Plug: 45ϕ×65 mm
Temperature of plug: 150° C.
Temperature of mold: 70° C.

The appearance of the cup-shaped thermoformed container obtained was observed visually, and it was found that there were no unevenness and no local thickness deviation, the stretching was uniform, it was excellent in transparency, and the appearance was also good.

Comparative Example 5

Production and evaluation of a thermoformed container was carried out in a same method, in Example 11, other than using the unmodified EVOH prepared in Comparative Example 1 as a barrier material. The appearance of the container thus obtained was observed visually, and it was found that there were unevenness and local thickness deviation and the stretching was not uniform.

Example 12

Polymerization was carried out in a same method other than, in Example 1 (1), changing the amount of MeOH to 6.6 kg, changing the amount of charging MPDAc to 29.7 g, changing the ethylene pressure to 3.8 MPa, and changing the amount of the initiator to 8.4 g. After four hours, when the conversion of VAc became 42%, the polymerization was stopped by cooling. Continuously, it was saponified in a same manner as Example 1 (2) to synthesize modified EVOH. Thus, 543 g of roughly dried modified EVOH was obtained.

Figure 3:
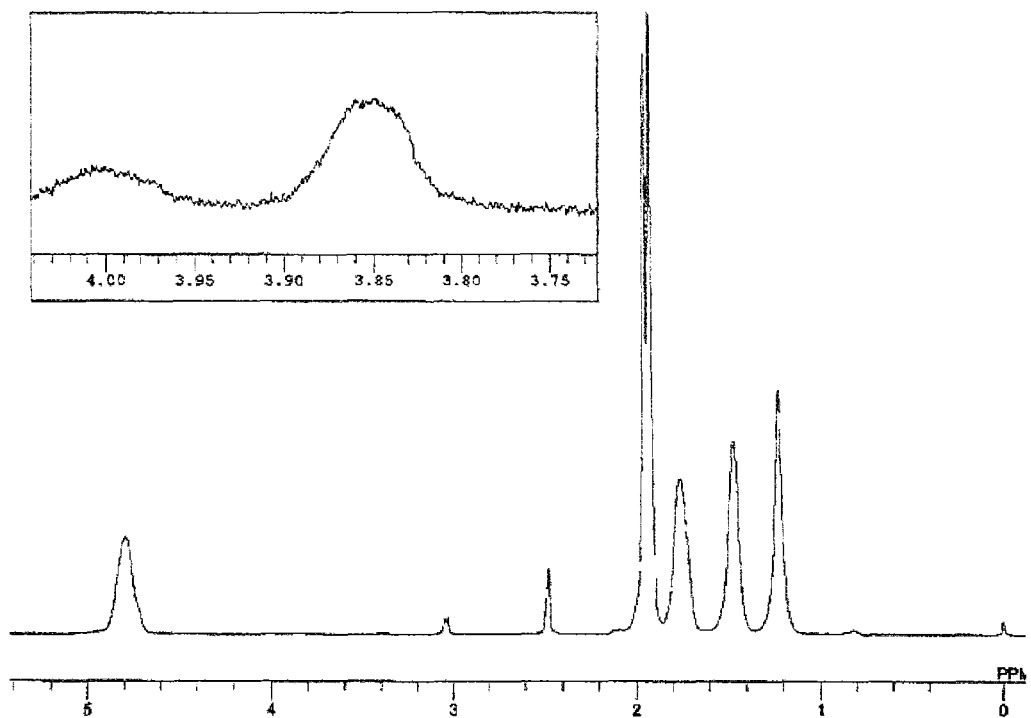
FIG. 3 is a ¹H-NMR spectrum of a modified ethylene-vinyl acetate copolymer obtained in Example 12.
Figure 4:
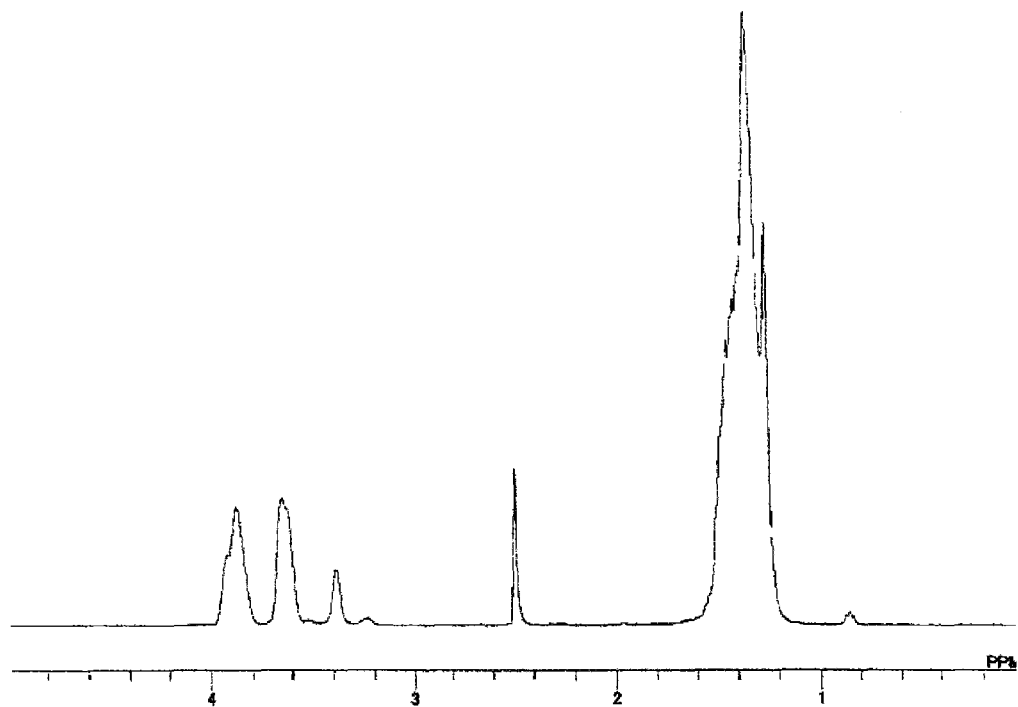
FIG. 4 is a ¹H-NMR spectrum of a modified ethylene-vinyl alcohol copolymer obtained in Example 12.

In a same manner as Example 1 other than changing modified EVOH to the one thus obtained, (3) Production of Modified EVOH Hydrous Pellet, (4) Production of Modified EVOH Composition Pellet, (5) Measurement of Content of Each Structural Unit in Modified EVAc, (6) Measurement of Degree of Saponification of Modified EVOH, (7) Measurement of Melting Point of Modified EVOH, (8) Measurement of Sodium Salt Content and Phosphoric Acid Compound Content in Modified EVOH Composition, (9) Preparation of Film, and (13) Measurement of Oxygen Transmission Rate were carried out. Results are shown in Table 2. The moisture content of the modified EVOH hydrous pellets obtained in (3) was 55 mass %. In addition, the sodium salt content in the modified EVOH composition measured in (8) was 150 ppm in terms of sodium elements and the phosphoric acid compound content was 10 ppm in terms of phosphate radicals. FIG. 3 illustrates a ¹H-NMR spectrum, measured in (5), of a modified EVAc obtained in Example 12, and FIG. 4 illustrates a ¹H-NMR spectrum, measured in (6), of a modified ethylene-vinyl alcohol copolymer obtained in Example 12.

(3-1) Preparation of Multilayer Film

A multilayer film was prepared using the modified EVOH composition thus obtained as a material by use of a three-materials five-layer coextrusion machine to form the film so as to make five-layer constitution of polypropylene layer/adhesive resin layer/modified EVOH layer/adhesive resin layer/polypropylene layer. Here, maleic anhydride modified polypropylene was used as the adhesive resin, and the polypropylene layers were 200 μm, the adhesive resin layers were 25 μm, and the modified EVOH layer was 50 μm.

(3-2) Peer Strength

For the multilayer structure prepared in (3-1) above, the peer strength was measured in the conditions below as an index of interlayer adhesion between the adhesive resin layer and the modified EVOH layer. That is, for a sample obtained by cutting out as a test piece in a strip shape of 15 mm×200 mm after being moisture conditioned in an atmosphere at 23° C. and 50% RH for seven days, measurement of the tensile strength at breaking point (gf/15 mm) was carried out by use of an Autograph AGS-H type manufactured by Shimadzu Corp. in the conditions of a span of 200 mm and a tensile speed of 250 mm/min. The measurement was carried out for ten samples, and the adhesion was evaluated by the following criteria.

A: all were 500 gf/15 mm

B: any one was less than 500 gf/15 mm (3-3) Thermal Stability

For the monolayer film of the modified EVOH composition prepared in (9) above, the thermal stability when melt extrusion was carried out using an extruder was evaluated as follows.

A: good

B: gel generation, coloration

Example 13

The modified EVOH obtained in Example 5 was evaluated in a same manner as Example 12. Results are collectively shown in Table 2.

Comparative Example 6

The unmodified EVOH obtained in Comparative Example 1 was evaluated in a same manner as Example 12. Results are collectively shown in Table 2.

Comparative Example 7

The unmodified EVOH obtained in Comparative Example 4 was evaluated in a same manner as Example 12. Results are collectively shown in Table 2.

Example 15

Polymerization was carried out in a same method other than, in Example 1 (1), changing the amount of MeOH to 4.2 kg, changing the ethylene pressure to 5.5 MPa, and changing the amount of charging MPDAc to 7.2 g. After three hours, when the conversion of VAc became 30%, the polymerization was stopped by cooling. Continuously, in a same manner as Example 1, modified EVOH was synthesized. The modified EVOH thus obtained was evaluated in a same manner as Example 12. Results are collectively shown in Table 2.

Example 16

The modified EVOH obtained in Example 4 was evaluated in a same manner as Example 12. Results are collectively shown in Table 2.

Comparative Example 8

The unmodified EVOH obtained in Comparative Example 2 was evaluated in a same manner as Example 12. Results are collectively shown in Table 2.

Comparative Example 9

The unmodified EVOH obtained in Comparative Example 3 was evaluated in a same manner as Example 12. Results are collectively shown in Table 2.

TABLE 2

| | Ethylene Content mol % | MPDAc Content mol % | Degree of Saponification mol % | Melting Point ° C. | Oxygen Transmission Rate *1) | Adhesive Strength | Thermal Stability |
|---|---|---|---|---|---|---|---|
| Example 12 | 32 | 0.2 | ≥99.9 | 182 | 1.7 | A | A |
| Example 13 | 32 | 0.4 | ≥99.9 | 180 | 2.0 | A | A |
| Example 14 | 27 | 0.2 | ≥99.9 | 190 | 1.4 | A | A |
| Example 15 | 44 | 0.2 | ≥99.9 | 163 | 3.9 | A | A |
| Example 16 | 32 | 1.4 | ≥99.9 | 173 | 3.2 | A | A |
| Comparative Example 6 | 32 | 0 | ≥99.9 | 183 | 1.3 | B | A |
| Comparative Example 7 | 32 | 0 | 97.0 | 158 | 9.0 | A | B |
| Comparative Example 8 | 27 | 0 | ≥99.9 | 191 | 1.2 | B | A |
| Comparative Example 9 | 44 | 0 | ≥99.9 | 165 | 3.8 | B | A |

*1) cc · 20 μm/m$^2$ · day · atm

Example 14

Polymerization was carried out in a same method other than, in Example 1 (1), changing the amount of MeOH to 6.3 kg, changing the amount of the initiator to 8.4 g, changing the ethylene pressure to 3.0 MPa, and changing the amount of charging MPDAc to 29.7 g. After four hours, when the conversion of VAc became 45%, the polymerization was stopped by cooling. Continuously, in a same manner as Example 1, modified EVOH was synthesized. The modified EVOH thus obtained was evaluated in a same manner as Example 12. Results are collectively shown in Table 2.

Example 17

Using the modified EVOH composition pellets obtained in Example 1, (5) Measurement of Content of Each Structural Unit in Modified EVAc, (6) Measurement of Degree of Saponification of Modified EVOH, (7) Measurement of Melting Point of Modified EVOH, (8) Measurement of Sodium Salt Content and Phosphoric Acid Compound Content in Modified EVOH Composition, and (9) Preparation of Film were carried out. Results are shown in Table 3. The sodium salt content in the modified EVOH composition measured in (8) was 150 ppm in terms of sodium elements, and the phosphoric acid compound content was 10 ppm in terms of phosphate radicals.

(4-1) Stretch Test

The monolayer film having a thickness of 150 μm obtained in (9) above was put in a pantograph type biaxial stretching machine manufactured by Toyo Seiki Seisaku-Sho, Ltd. to carry out simultaneous biaxial stretching at 80° C. at a draw ratio of from 2×2 time to 4×4 time, thereby obtaining a heat shrink film. The greatest draw ratio at which the film was able to be stretched with no unevenness and no local thickness deviation without being broken was defined as a maximum draw ratio. As a result, even at a draw ratio of 4.0×4.0 time, it was able to be stretched with no stretching unevenness and no local thickness deviation. In addition, a heat shrink film obtained by stretching at a draw ratio of 3×3 time was evaluated in accordance with the criteria below. Results are shown in Table 3.

Decision: Criteria

A: No stretching unevenness and no local thickness deviation were found and the appearance was good.

B: Stretching unevenness or local thickness deviation occurred. Alternatively, breakage occurred in the film.

(4-2) Shrinkage Test

The heat shrink film at a draw ratio of 3×3 time obtained in (4-1) above was cut with into 10 cm×10 cm and immersed in hot water at 80° C. for ten seconds to calculate a shrinkage ratio (%) as below. The shrinkage ratio was 85.3%.

$$\text{Shrinkage ratio (\%)} = \{(S-s)/S\} \times 100$$

S: area of film before shrinkage
s: area of film after shrinkage (4-3) Measurement of Oxygen Transmission Rate The monolayer film having a thickness of 20 μm obtained in (9) above was moisture conditioned in the conditions at 20° C. and 85% RH for three days, and after that, measurement ("OX-TRAN MODEL 2/21" manufactured by MOCON, Inc.) of the oxygen transmission rate was carried out in the same conditions. As a result, the oxygen transmission rate (OTR) was 4.5 cc·20 μm/m²·day·atm. In addition, the heat shrink film obtained in (4-1) above by stretching at a draw ratio of 3×3 time was subjected to measure the oxygen transmission rate (OTR) in a same manner, and it was 3.3 cc·20 μm/m²·day·atm.

(4-4) Preparation of Multilayer Heat Shrink Film Having Modified EVOH Composition Layer and Ionomer Resin Layer Using the modified EVOH composition pellets obtained in (4) above, a multilayer film [layer constitution: ionomer resin layer/adhesive resin layer/modified EVOH composition layer/adhesive resin layer/ionomer resin layer, thickness (μm): 100/50/50/50/100] was prepared. The coextrusion machines and conditions used at this time were as below. As constitution of the film, the ionomer resin ("Himilan 1652" produced by Dupont-Mitsui Polychemicals Co., Ltd.) layers of both outer layers were 100 μm each, the adhesive resin ("Admer NF500" produced by Mitsui Chemicals, Inc.) layers were 50 μm each, and further, the modified EVOH composition layer was 50 μm. Using the multilayer film thus obtained, simultaneous biaxial stretching was carried out, after preheating at 80° C. for 30 seconds, at a draw ratio of 4×4 time in a pantograph type biaxial stretching machine to obtain a heat shrink film. The heat shrink film thus obtained was evaluated in a method of (4-7) below. Results are 4 shown in Table 4.

(Coextrusion Molding Condition)

Extrusion temperature of each resin: supply area/compression area/measurement area/die=170° C./170° C./melting point of modified EVOH+30 to 45° C./melting point of modified EVOH+30 to 45° C.

Extruder:
  ionomer resin 32φ extruder, model GT-32-A (manufactured by Research Laboratory of Plastics Technology Co., Ltd.)
  adhesive resin 25φ extruder, model P25-18AC (manufactured by Osaka Seiki Co., Ltd.)
  modified EVOH 20φ extruder for laboratory use, ME type CO-EXT (manufactured by Toyo Seiki Seisaku-Sho, Ltd.)

T-die: for 300 mm-wide three-materials five-layer extrusion (manufactured by Research Laboratory of Plastics Technology Co., Ltd.)

Temperature of cooling roll: 50° C.

Drawing speed: 4 m/min (4-5) Preparation of Multilayer Heat Shrink Film Having Modified EVOH Composition Layer and Ethylene-Vinyl Acetate Copolymer (EVA) Layer Using the modified EVOH composition pellets obtained in (4) above, a multilayer film [layer constitution: EVA layer/adhesive resin layer/modified EVOH composition layer/adhesive resin layer/EVA layer, thickness (μm): 300/50/50/50/300] was prepared. The coextrusion machines and conditions used at this time were as below. As the EVA, "Evaflex EV340" produced by Du Pont-Mitsui Polychemicals Co., Ltd. was used, and as the adhesive resin, "Admer VF500" produced by Mitsui Chemicals, Inc. was used. Using the multilayer film thus obtained, simultaneous biaxial stretching was carried out, after preheating at 80° C. for 30 seconds, at a draw ratio of 3×3 time in a pantograph type biaxial stretching machine manufactured by Toyo Seiki Seisaku-Sho, Ltd. to obtain a heat shrink film. The heat shrink film thus obtained was evaluated in a method of (4-7) below. Results are 4 shown in Table 4.

(Coextrusion Condition)

Extrusion temperature of each resin: supply area/compression area/measurement area/die=170° C./170° C./melting point of modified EVOH+30 to 45° C./melting point of modified EVOH+30 to 45° C.

Extruder:
  EVA 32φ extruder, model GT-32-A (manufactured by Research Laboratory of Plastics Technology Co., Ltd.)
  adhesive resin 25φ extruder, model P25-18AC (manufactured by Osaka Seiki Co., Ltd.)
  modified EVOH 20φ extruder for laboratory use, ME type CO-EXT (manufactured by Toyo Seiki Seisaku-Sho, Ltd.)

T-die: for 300 mm-wide three-materials five-layer extrusion (manufactured by Research Laboratory of Plastics Technology Co., Ltd.)

Temperature of cooling roll: 50° C.

Drawing speed: 4 m/min (4-6) Preparation of Multilayer Heat Shrink Film Having Modified EVOH Composition Layer and Polyamide Layer Using the modified EVOH composition pellets obtained in (4) above, a multilayer film [layer constitution: polyamide layer/modified EVOH composition layer/polyamide layer/adhesive resin layer/polyethylene layer, thickness (μm): 100/50/100/75/175] was prepared. The coextrusion machines and conditions used at this time were as below. As the polyamide, "Ube nylon 5034B" produced by Ube Industries, Ltd. was used, and as the adhesive resin, "AdmerNF587" produced by Mitsui Chemicals, Inc. was used, and as the polyethylene, "Novatec LD LF128" produced by Japan Polyethylene Corp. was used. Using the multilayer film thus obtained, simultaneous biaxial stretching was carried out, after preheating at 80° C. for 30 seconds, at a draw ratio of 3×3 time in a pantograph type biaxial stretching machine manufactured by Toyo Seiki Seisaku-Sho, Ltd. to obtain a heat shrink film. The heat shrink film thus obtained was evaluated in a method of (4-7) below. Results are 4 shown in Table 4.
(Coextrusion Condition)
  Extrusion temperature of polyamide: supply area/compression area/measurement area/die=220/240/260/260° C.
Extrusion temperature of modified EVOH composition: supply area/compression area/measurement area/die=170° C./170° C./melting point of modified EVOH+30 to 45° C./260° C.
Extruder:
  Polyamide 32ϕ extruder, model GT-32-A (manufactured by Research Laboratory of Plastics Technology Co., Ltd.)
  adhesive resin 25ϕ extruder, model P25-18AC (manufactured by Osaka Seiki Co., Ltd.)
  modified EVOH composition 20ϕ extruder for laboratory use, ME type CO-EXT (manufactured by Toyo Seiki Seisaku-Sho, Ltd.)
T-die: for 300 mm-wide three-materials five-layer extrusion (manufactured by Research Laboratory of Plastics Technology Co., Ltd.)
Temperature of cooling roll: 60° C.
Drawing speed: 4 m/min
(4-7) Appearance Evaluation after Shrinkage
  The multilayer heat shrink films obtained in (4-4) through (4-6) above were cut with into 10 cm×10 cm and immersed in hot water at 90° C. for ten seconds and the films after shrinkage were visually observed to be evaluated by the criteria below. Results are shown in Table 4.
A: no coloration and no whitening occurred and shrank uniformly.
B: coloration or whitening occurred.

Example 18

Using the modified EVOH obtained in Example 2, in a same manner as Example 17, preparation and evaluation of a monolayer heat shrink film were carried out. Results are collectively shown in Table 3. In accordance with (4-1) above, the oxygen transmission rate (OTR) of the heat shrink film obtained by stretching at a draw ratio of 3×3 time was measured in accordance with (4-3) above, and it was 2.3 cc·20 μm/m²·day·atm.

Example 19

Using the modified EVOH obtained in Example 3, in a same manner as Example 17, preparation and evaluation of a monolayer heat shrink film were carried out. Results are collectively shown in Table 3.

Example 20

Using the modified EVOH obtained in Example 4, in a same manner as Example 17, preparation and evaluation of a monolayer heat shrink film were carried out. Results are collectively shown in Table 3.

Example 21

Using the modified EVOH obtained in Example 5, in a same manner as Example 17, preparation and evaluation of a monolayer heat shrink film were carried out. Results are collectively shown in Table 3.

Example 22

Using the modified EVOH obtained in Example 6, in a same manner as Example 17, preparation and evaluation of a monolayer heat shrink film were carried out. Results are collectively shown in Table 3.

Example 23

Using the modified EVOH obtained in Example 8, in a same manner as Example 17, preparation and evaluation of a monolayer heat shrink film were carried out. Results are collectively shown in Table 3.

Example 24

Using the modified EVOH obtained in Example 9, in a same manner as Example 17, preparation and evaluation of a monolayer heat shrink film were carried out. Results are collectively shown in Table 3.

Comparative Example 10

Using the unmodified EVOH obtained in Comparative Example 1, in a same manner as Example 17, preparation and evaluation of a monolayer heat shrink film and a multilayer heat shrink film were carried out. Results are collectively shown in Tables 3 and 4.

Comparative Example 11

Using the unmodified EVOH obtained in Comparative Example 2, in a same manner as Example 17, preparation and evaluation of a monolayer heat shrink film were carried out. Results are collectively shown in Table 3.

Comparative Example 12

Using the unmodified EVOH obtained in Comparative Example 3, in a same manner as Example 17, preparation and evaluation of a monolayer heat shrink film were carried out. Results are collectively shown in Table 3.

Comparative Example 13

The appearance of a commercially available PVDC-based heat shrink film (Barrialon-S produced by Asahi Kasei Corp.) after shrinkage was evaluated. The appearance after shrinkage was evaluated in a method described in (4-7). The layer constitution of the above PVDC-based heat shrink film was as below. Results of evaluation are collectively shown in Table 4.
Layer constitution: polyethylene/ethylene-vinyl acetate copolymer/polyvinylidene chloride/ethylene-vinyl acetate copolymer/polyethylene (thickness 7/18/9/25/13: unit in μm)

TABLE 3

| | Ethylene Content mol % | MPDAc Content mol % | Degree of Saponification mol % | Melting Point °C. | Maximum Draw Ratio time | Stretchability *5) | Shrinkage Ratio % | Oxygen Transmission Rate *1) *2) |
|---|---|---|---|---|---|---|---|---|
| Example 17 | 32 | 3.9 | ≥99.9 | 151 | 4 × 4 | A | 85.3 | 4.5 |
| Example 18 | 32 | 3.1 | ≥99.9 | 158 | 3.5 × 3.5 | A | 82.2 | 3.4 |
| Example 19 | 32 | 3.0 *3) | ≥99.9 | 157 | 3.5 × 3.5 | A | 81.6 | 3.6 |
| Example 20 | 32 | 1.4 | ≥99.9 | 173 | 3.25 × 3.25 | A | 73.7 | 3.2 |
| Example 21 | 32 | 0.4 | ≥99.9 | 180 | 3 × 3 | A | 70.9 | 2.0 |
| Example 22 | 32 | 1.4 | 98.9 | 168 | 3.5 × 3.5 | A | 82.3 | 7.2 |
| Example 23 | 27 | 3.0 | ≥99.9 | 166 | 3 × 3 | A | 72.2 | 3.0 |
| Example 24 | 44 | 3.0 | ≥99.9 | 134 | 4 × 4 | A | 84.8 | 5.0 |
| Comparative Example 10 | 32 | 0 | ≥99.9 | 183 | 2 × 2 | B | 58.0 | 1.3 |
| Comparative Example 11 | 27 | 0 | ≥99.9 | 191 | *4) | B | — | 1.2 |
| Comparative Example 12 | 44 | 0 | ≥99.9 | 165 | 2.5 × 2.5 | B | — | 3.8 |

*1) oxygen transmission rate of monolayer film before stretching
*2) cc · 20 μm/m² · day · atm
*3) 2-methylene-1,3-propanediol
*4) Broken in stretch test of 2 × 2 time.
*5) A: No stretching unevenness and no local thickness deviation were found and appearance was good.
B: Stretching unevenness and local thickness deviation occurred. Alternatively, breakage occurred in film.

TABLE 4

| | Layer constitution [1] | Appearance |
|---|---|---|
| Example 17 | IO/AD/m-EVOH/AD/IO | A |
| Example 17 | EVA/AD/m-EVOH/AD/EVA | A |
| Example 17 | PA/m-EVOH/PA/AD/PE | A |
| Comparative Example 10 | IO/AD/um-EVOH/AD/IO | B |
| Comparative Example 10 | EVA/AD/um-EVOH/AD/EVA | B |
| Comparative Example 10 | PA/um-EVOH/PA/AD/PE | B |
| Comparative Example 13 | PE/EVA/PVDC/EVA/PE | B |

[1] IO: ionomer resin layer, AD: adhesive resin layer, m-EVOH: modified EVOH composition layer, EVA: ethylene-vinyl acetate copolymer layer, PA: polyamide layer, PE: polyethylene layer, um-EVOH: unmodified EVOH composition layer, PVDC: polyvinylidene chloride layer Example 25

Using the modified EVOH composition pellets obtained in Example 1, (5) Measurement of Content of Each Structural Unit in Modified EVAc, (6) Measurement of Degree of Saponification of Modified EVOH, (7) Measurement of Melting Point of Modified EVOH, (8) Measurement of Sodium Salt Content and Phosphoric Acid Compound Content in Modified EVOH Composition, (9) Preparation of Film, and (10) Measurement of Young's Modulus were carried out. Results are shown in Table 5. The sodium salt content of the modified EVOH composition measured in (8) was 150 ppm in terms of sodium elements, and the phosphoric acid compound content was 10 ppm in terms of phosphate radicals.

(5-1) Measurement of Oxygen Transmission Rate

The monolayer film having a thickness of 20 μm obtained in (9) above was moisture conditioned in the conditions at 20° C. and 85% RH for three days, and after that, measurement ("OX-IRAN MODEL 2/21" manufactured by MOCON, Inc.) of the oxygen transmission rate was carried out in the same conditions. As a result, the oxygen transmission rate (OTR) was 4.5 cc·20 μm/m²·day·atm. Results are shown in Table 5.

Synthesis Example 1

A slurry comprising 100 parts by weight of terephthalic acid and 44.83 parts by weight of ethylene glycol was prepared and 0.01 parts by weight of germanium dioxide, 0.01 parts by weight of phosphorous acid, and 0.01 parts by weight of tetraethylammonium hydroxide were added thereto. The slurry was heated under pressure (absolute pressure of 2.5 Kg/cm²) at a temperature of 250° C. for esterification to a degree of esterification up to 95%, thereby giving an oligomer. Subsequently, the resulting oligomer was subjected to melt polycondensation under a reduced pressure of 1 mmHg at a temperature of 270° C. to obtain polyester having an intrinsic viscosity of 0.50 dl/g. The resulting polyester was extruded through a nozzle into a strand, cooled with water, and cut for pelletization into columnar pellets (diameter: about 2.5 mm, length: about 2.5 mm). Subsequently, the resulting polyester pellets were pre-dried at 160° C. for 5 hours and crystallized. Thus was obtained a polyester prepolymer.

Each structural unit content of the resulting polyester prepolymer was measured by NMR. The terephthalic acid unit content, the ethylene glycol unit content, and the content of diethylene glycol unit by-produced in the polyester were 50.0 mol %, 48.9 mol %, and 1.1 mol %, respectively. In addition, the terminal carboxyl group concentration was measured according to the methods mentioned below to be 38 μq/g. The melting point was measured in a method below, and it was 253° C. Subsequently, the resulting polyester prepolymer was pre-dried at 160° C. for 5 hours and crystallized. The crystallized polyester prepolymer was subjected to solid-phase polymerization using a rotary vacuum solid-phase polymerization device, under a reduced pressure of 0.1 mmHg at 220° C. for 10 hours, into a thermoplastic polyester resin having an increased molecular weight.

Terminal carboxyl group concentration of the polyester polymer: in a mixed solvent of 10 mL chloroform and 10 mL of benzyl alcohol, 0.2 g of the polyester polymer was dissolved by heating. The solution thus obtained was cooled down to normal temperature and phenol red was added as an indicator. After that, titration was carried out with a ¹/₁₀₀ N-KOH methanol solution to obtain an amount of terminal carboxyl group of the polyester polymer.

Content of each structural unit in polyester: it was determined from a ¹H-NMR (nuclear magnetic resonance) spectrum (measured by model "JNM-GX-500" manufactured by JEOL Ltd.) of the polyester using deuterated trifluoroacetic acid as a solvent. As a result, the contents of terephthalic acid unit, ethylene glycol unit, and diethylene glycol unit in the thermoplastic polyester resin obtained in Synthesis Example 1 above were 50.0 mol %, 48.9 mol % and 1.1 mol %, respectively.

Intrinsic viscosity of polyester: a sample was taken out of the polyester layer of the body part of a multilayer container to measure in an equiweight mixed solvent of phenol and tetrachloroethane, at 30° C. using an Ubbelohde's viscometer (model "HRK-3" manufactured by Hayashi Seisakusho Co. Ltd.). The intrinsic viscosity of the polyester thus obtained was 0.83 dl/g.

Glass transition temperature and melting point of polyester: a sample is taken out of the polyester layer of the body part of a multilayer container, measurement was made by differential scanning calorimetry (DSC) according to JIS K7121 using a differential scanning calorimeter (DSC) of model RDC220/SSC5200H manufactured by Seiko Instruments & Electronics Ltd., and the sample was kept at a temperature of 280° C. for 5 minutes, then cooled to a temperature of 30° C. in a condition at a cooling rate of 100° C./min, further kept at the temperature for 5 minutes, and then heated in a condition at a heating rate of 10° C./min. For temperature calibration, indium and lead were used. In addition, the glass transition temperature as referred in the present invention indicates the midway glass transition temperature (Tmg) according to the JIS above, and further the melting point referred herein indicates the peak point in melting (Tpm) according to the same. The melting point of the polyester thus obtained was 252° C., and the glass transition temperature was 80° C.

(5-2) Preparation of Parison

Using the modified EVOH composition pellets prepared in Example 1 and the thermoplastic polyester (PES) prepared in Synthesis Example 1, coinjection molding was carried out using a coinjection molding machine (model SL160, four cavities) manufactured by KORTEC/HUSKY, where the temperature of the injection machine for PES was 280° C.; the temperature of the injection machine for the modified EVOH composition pellet was 210° C.; the temperature of the hot runner block in which the PES and the modified EVOH were combined was 270° C.; the temperature of the injection mold core was 10° C.; and the temperature of the injection mold cavity was 10° C., to obtain a two-materials three-layer parison of PES/modified EVOH composition/PES.

When the parison was observed visually, no streaks were found and the leading edge of the modified EVOH layer in the opening of the parison was in a good state.

(5-3) Preparation of Stretch Blow Molded Container

Stretch blow molding was carried out by heating the parison obtained in (5-2) above to 105° C. at a surface temperature using a stretch blow molding machine (model LB01, one 530-mL cavity) manufactured by CRUPP CORPOPLAST MASCHINENBAU, to obtain a two-materials three-layer coinjection stretch blow molded container. When the blow molded container was observed visually, no streaks, no bubbles, and no gels were found and, therefore, the container had a good appearance. The thickness of the body part of the container thus obtained was 340 μm, and the thickness of the modified EVOH composition layer was 20 μm. Using the multilayer blow molded container obtained, the incidence of delamination in the container, the haze of the container body, and the oxygen transmission rate of the container were measured in accordance with the methods below.

(5-4) Incidence of Delamination in Multilayer Container

Each of 100 bottles obtained in (5-3) above was filled with water as a content and hermetically sealed with a stopper under normal pressure. Each container with its body being kept horizontally was spontaneously dropped from a height of 60 cm onto a triangular stand having a length of 20 cm and having an angle of 90° at its edge that faces the dropping container. The dropping test was conducted only once, in which the edge of the stand is targeted to the center of the body of the bottle. From the number of the bottles in which delamination occurred, the incidence of delamination was calculated according to the following equation. The incidence of delamination was 4%.

Incidence of delamination=[(number of bottles in which delamination occurred)/100]×100(%)

(5-5) Haze of Multilayer Container

The body of a bottle obtained in (5-3) above was divided into four equal portions around the circumference at its center, and the internal haze of each portion was measured with a Poic integrating-sphere light transmittance/complete light reflectance meter (HR-100 Model from Murakami Color Technology Laboratories) according to ASTM D1003-61. The data were averaged and the resulting value indicated the haze of the container. The haze of the bottle was 2.7%.

(5-6) Oxygen Transmission Rate of Multilayer Container

Without changing the form of the container obtained in (5-3) above, it was conditioned in the temperature and the humidity at 20° C. and 65% RH, and the oxygen transmission rate per one container was measured using an oxygen transmission rate meter (OX-TRAN-10/50A manufactured by Modern Control, Inc.). The oxygen transmission rate was 0.018 cc/container·day·atm.

Example 26

Using the modified EVOH obtained in Example 2, a multilayer container was produced for evaluation in a same manner as Example 25. Results are collectively shown in Table 5 and Table 6.

Example 27

Using the modified EVOH obtained in Example 3, a multilayer container was produced in a same manner as Example 25 for evaluation. Results are collectively shown in Table 5 and Table 6.

Example 28

Using the modified EVOH obtained in Example 4, a multilayer container was produced in a same manner as Example 25 for evaluation. Results are collectively shown in Table 5 and Table 6.

Example 29

Using the modified EVOH obtained in Example 6, a multilayer container was produced in a same manner as Example 25 for evaluation. Results are collectively shown in Table 5 and Table 6.

Example 30

Using the modified EVOH obtained in Example 8, a multilayer container was produced in a same manner as Example 25 for evaluation. Results are collectively shown in Table 5 and Table 6.

Example 31

Using the modified EVOH obtained in Example 9, a multilayer container was produced in a same manner as Example 25 for evaluation. Results are collectively shown in Table 5 and Table 6.

Comparative Example 14

Using the unmodified EVOH obtained in Comparative Example 1, a multilayer container was produced in a same manner as Example 25 for evaluation. Results are collectively shown in Table 5 and Table 6.

Comparative Example 15

Using the unmodified EVOH obtained in Comparative Example 2, a multilayer container was produced in a same manner as Example 25 for evaluation. Results are collectively shown in Table 5 and Table 6.

Comparative Example 16

Using the unmodified EVOH obtained in Comparative Example 3, a multilayer container was produced in a same manner as Example 25 for evaluation. Results are collectively shown in Table 5 and Table 6.

As shown in Examples 25 through 31, coinjection stretch blow molded containers using the modified EVOH composition pellets of the present invention are excellent in moldability of parisons, delamination resistance, transparency, and oxygen gas barrier property. In contrast, in Comparative Examples 14 through 16 using unmodified EVOH, the moldability of parisons and delamination resistance are severely poor.

TABLE 5

|  | Ethylene Content mol % | MPDAc Content mol % | Degree of Saponification mol % | Melting Point °C. | Young's Modulus GPa | Oxygen Transmission Rate *1) |
|---|---|---|---|---|---|---|
| Example 25 | 32 | 3.9 | ≥99.9 | 151 | 1.3 | 4.5 |
| Example 26 | 32 | 3.1 | ≥99.9 | 158 | 1.6 | 3.4 |
| Example 27 | 32 | 3.0*2) | ≥99.9 | 157 | 1.6 | 3.6 |
| Example 28 | 32 | 1.4 | ≥99.9 | 173 | 1.8 | 3.2 |
| Example 29 | 32 | 1.4 | 98.9 | 168 | 1.5 | 7.2 |
| Example 30 | 27 | 3.0 | ≥99.9 | 166 | 2.4 | 3.0 |
| Example 31 | 44 | 3.0 | ≥99.9 | 134 | 0.6 | 5.0 |
| Comparative Example 14 | 32 | 0 | ≥99.9 | 183 | 2.5 | 1.3 |
| Comparative Example 15 | 27 | 0 | ≥99.9 | 191 | 3.5 | 1.2 |
| Comparative Example 16 | 44 | 0 | ≥99.9 | 165 | 1.5 | 3.8 |

*1) cc · 20 μm/m² · day · atm
*2) 2-methylene-1,3-propanediol

TABLE 6

|  | Moldability of Parison *3) | Incidence of Delamination % | Haze % | Oxygen Transmission Rate *4) |
|---|---|---|---|---|
| Example 25 | A | 4 | 2.7 | 0.018 |
| Example 26 | A | 5 | 2.6 | 0.017 |
| Example 27 | A | 5 | 2.6 | 0.017 |
| Example 28 | A | 12 | 2.6 | 0.015 |
| Example 29 | A | 4 | 2.7 | 0.032 |
| Example 30 | A | 6 | 2.4 | 0.016 |
| Example 31 | A | 4 | 3.1 | 0.021 |
| Comparative Example 14 | B | 95 | 2.5 | 0.011 |
| Comparative Example 15 | B | 96 | 2.6 | 0.010 |
| Comparative Example 16 | B | 85 | 2.9 | 0.019 |

*3) A: good in leading edge of parison after molding. B: poor in leading edge of parison after molding.
*4) cc/container · day · atm

Example 32

Using the modified EVOH composition pellets obtained in Example 1, (5) Measurement of Content of Each Structural Unit in Modified EVAc, (6) Measurement of Degree of Saponification of Modified EVOH, (7) Measurement of Melting Point of Modified EVOH, and (8) Measurement of Sodium Salt Content and Phosphoric Acid Compound Content in Modified EVOH Composition were carried out. Results are shown in Table 7. The sodium salt content of the modified EVOH composition measured in (8) was 150 ppm in terms of sodium elements, and the phosphoric acid compound content was 10 ppm in terms of phosphate radicals.

(6-1) Preparation of Blow Molded Container

As high density polyethylene (HDPE), "HZ8200B" (MFR at 190° C. under a load of 2160 g=0.01 g/10 min.) produced by Mitsui Chemicals, Inc. was used, as an adhesive resin, "Admer GT4" (MFR at 190° C. under a load of 2160 g=0.2 g/10 min.) produced by Mitsui Chemicals, Inc. was used, and as a barrier material, the modified EVOH composition pellets prepared in Example 1 was used. A three-materials five-layer parison having a layer constitution, HDPE/adhesive resin/barrier material/adhesive resin/HDPE, was extruded by use of a blow molding machine TB-ST-6P manufactured by Suzuki Seiko-sho, Co., Ltd. while setting extrusion temperature for each resin and die temperature to 210° C. The parison was blown in a mold at 15° C. and cooled for 20 seconds, yielding a 500-mL multilayer container. The container had an average thickness of 2175 μm in the body part and the thickness of each layer was (inside) HDPE/adhesive resin/barrier material/adhesive resin/HDPE (outside)=1000/50/75/50/1000 μm. The container was able to be molded without any particular problems. In addition, the container had a good appearance.

(6-2) Evaluation of Fuel Barrier Property

In the multilayer container obtained in (6-1) above, 300 ml of model gasoline {mixture of a ratio of toluene (45 weight %):isooctane (45 weight %): methanol (10 weight %)} was poured and completely sealed using an aluminum foil not to leak, then left in an atmosphere at 40° C. and 65% RH to obtain an amount of decrease in the bottle weight (average value of n=6) after 14 days. The amount of decrease in weight was 0.45 g.

(6-3) Measurement of Breaking Height

In the multilayer container obtained in (6-1) above, ethylene glycol was filled 60% relative to the internal volume and left in a freezer at 40° C. for three days, and after that, dropped on the concrete to obtain a dropping height to break the bottle (leak ethylene glycol inside the container). For the breaking height, a 50% breaking height was obtained using a test result of n=30 in a method shown in JIS test methods (K7211 in "8. Calculation"). The breaking height was 7.2 m. Results of evaluation are collectively shown in Table 7.

(6-4) Preparation of Multilayer Sheet

A multilayer sheet (HDPE/adhesive resin/barrier material/ adhesive resin/HDPE) was prepared by use of a three-material five-layer coextrusion machine using the modified EVOH composition pellets prepared in Example 1 as a barrier material. The constitution of the film included 450 μm of the HDPE resin ("HZ8200B" produced by Mitsui Chemicals, Inc.) of the inner and outer layers, 50 μm each of the adhesive resin ("AdmerGT4" produced by Mitsui Chemicals, Inc.), and 75 μm of the barrier material of the middle layer.

Temperature of heater: 400° C.
Plug: 45ϕ×65 mm
Temperature of plug: 150° C.
Temperature of mold: 70° C.

The thermoformed container thus obtained was a cup-shaped container having an internal volume of approximately 150 ml, and around a bottom portion of the cup-shaped container was cut to measure the thickness of the intermediate layer of the modified EVOH composition at a bottom corner of the cup by cross-section observation with an optical microscope (average value of n=5). The thickness of the intermediate layer at the cup corner was 30 μm. Results of evaluation are collectively shown in Table 7.

(6-6) Evaluation of Thermoformed Container

In the thermoformed container obtained in (6-5) above, 140 ml of model gasoline {mixture of a ratio of toluene (45 weight %):isooctane (45 weight %): methanol (10 weight %)} was poured and, after placing one cut the coextrusion sheet obtained in (6-4) above in a circle shape on a cup top, molded by hot plate welding in a state of completely put on the lid not to leak the contents to obtain a cup-shaped container having the model gasoline enclosed therein. It was left in an atmosphere at 40° C. and 65% RH to obtain an amount of decrease in the cup weight (average value of n=6) after 14 days. The amount of decrease in weight was 0.35 g. Results of evaluation are collectively shown in Table 7.

(6-7) Evaluation of Impact Resistance

Using the modified EVOH composition pellets obtained in Example 1, an injected piece was prepared by use of an injection molding machine (FS-80S manufactured by Nissei Ltd.) to obtain impact strength using an Izod tester in a condition at room temperature according to JIS K7110. Ten injected pieces were measured and an average value of the measurement results was defined as the impact strength. Results of evaluation are collectively shown in Table 7.

Comparative Example 17

Using the unmodified EVOH obtained in Comparative Example 1, in a same manner as Example 32, a blow molded container, a thermoformed container, and a test piece for impact resistance evaluation were prepared for respective evaluation. Results are collectively shown in Table 7.

TABLE 7

|  |  | Izod Impact Strength kJ/m$^2$ | Blow Molded Container | | Thermoformed Container | |
|---|---|---|---|---|---|---|
|  |  |  | Amount of Decrease in Bottle Weight g | 50% Braking Height m | Thickness of Corner in Intermediate Layer μm | Amount of Decrease in Cup Weight g |
| Example 32 | Modified EVOH | 30 | 0.45 | 7.2 | 30 | 0.35 |
| Comparative Example 17 | Unmodified EVOH | 22 | 0.4 | 4.2 | 12 | 0.4 |

(6-5) Preparation of Thermoformed Container

A thermoformed container was obtained by thermoforming the multilayer sheet obtained in (6-4) above by use of a thermoforming machine (a vacuum-pressure deep drawing molding machine, model "FX-0431-3" manufactured by Asano Laboratories Co., Ltd.) into a shape of a round cup (mold shape: upper part 75 mmϕ, lower part 60 mmϕ, depth 75 mm, drawn ratio S=1.0) at a sheet temperature of 160° C. using compressed air (pressure: 5 kgf/cm$^2$). The molding conditions are as follows.

DESCRIPTION OF REFERENCE NUMERALS

1 Opening of container
2 Multilayer portion (resin composition layer/another thermoplastic resin layer)
3 Monolayer portion (another thermoplastic resin layer)
4 Leading edge

What is claimed is:
1. A modified ethylene-vinyl alcohol copolymer, wherein:
the copolymer is represented by formula (I),
contents (mol %) of a, b, and c based on the total monomer units satisfy formulae (1) through (3), and a degree of saponification (DS) defined by formula (4) is not less than 90 mol %;
where formula (I) is:

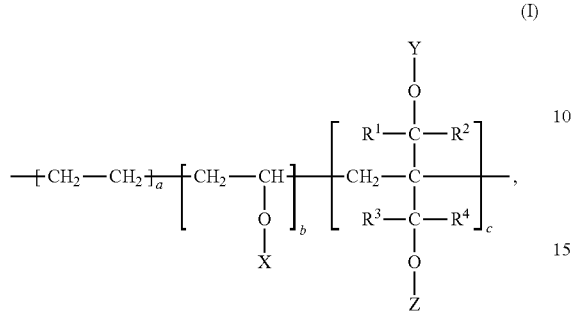

where each of $R^1$, $R^2$, $R^3$, and $R^4$ independently denotes a hydrogen atom or an alkyl group having a carbon number of from 1 to 10, and the alkyl group may include a hydroxyl group, an alkoxy group, or a halogen atom, each of X, Y, and Z independently denotes a hydrogen atom, a formyl group, or an alkanoyl group having a carbon number of from 2 to 10, where a, b and c conform to the ranges or relationships described by formulae (1), (2) and (3):

$$18 \leq a \leq 55 \quad (1)$$

$$0.01 \leq c \leq 20 \quad (2),$$

$$[100-(a+c)] \times 0.9 \leq b \leq [100-(a+c)] \quad (3), \text{ and}$$

where $DS$=[(Total Number of Moles of Hydrogen Atoms in X, Y, and Z)/(Total Number of Moles of X, Y, and Z)]×100 (4).

2. The modified ethylene-vinyl alcohol copolymer according to claim 1, wherein $R^1$, $R^2$, $R^3$, and $R^4$ are hydrogen atoms.

3. The modified ethylene-vinyl alcohol copolymer according to claim 1, wherein each of X, Y, and Z is independently a hydrogen atom or an acetyl group.

4. The modified ethylene-vinyl alcohol copolymer according to claim 1, wherein an oxygen transmission rate at 20° C. and 85% RH is not more than 100 cc·20 μm/m²·day·atm.

5. A barrier material comprising the modified ethylene-vinyl alcohol copolymer according to claim 1.

6. A resin composition comprising the modified ethylene-vinyl alcohol copolymer according to claim 1.

7. The resin composition according to claim 6, comprising the modified ethylene-vinyl alcohol copolymer and alkali metal salt, wherein the alkali metal salt is contained from 10 to 500 ppm in terms of alkali metal element.

8. An extrusion molded article comprising the modified ethylene-vinyl alcohol copolymer according to claim 1.

9. A film or a sheet comprising the modified ethylene-vinyl alcohol copolymer according to claim 1.

10. The film or the sheet according to claim 9, wherein the film or the sheet is stretched to seven times or more in an area ratio.

11. A laminated film or a laminated sheet comprising a layer of a thermoplastic resin other than the modified ethylene-vinyl alcohol copolymer laminated on the film or the sheet according to claim 9.

12. A thermoformed article comprising the modified ethylene-vinyl alcohol copolymer according to claim 1.

13. A method of producing the modified ethylene-vinyl alcohol copolymer according to claim 1 comprising:
saponifying a modified ethylene-vinyl ester copolymer of formula (IV);
wherein the modified ethylene-vinyl ester copolymer of formula (IV) was obtained by radical polymerization of ethylene, vinyl ester represented by formula (II), and an unsaturated monomer of formula (III);
wherein formula (II) is:

where $R^5$ denotes a hydrogen atom or an alkyl group having a carbon number of from 1 to 9;
wherein formula (III) is

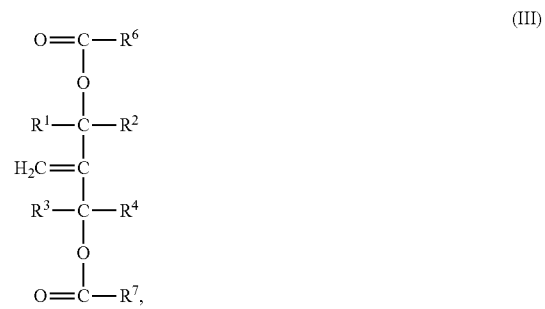

where $R^1$, $R^2$, $R^3$, and $R^4$ are same as in formula (I) and each of $R^6$ and $R^7$ independently denotes a hydrogen atom or an alkyl group having a carbon number of from 1 to 9;
wherein formula (IV) is:

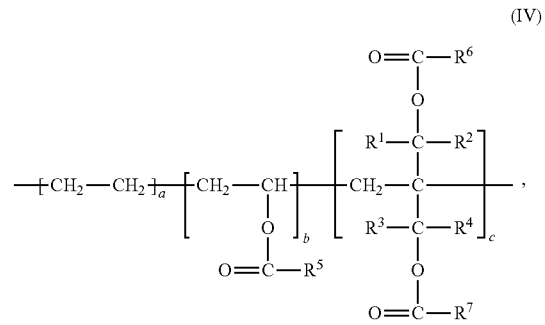

where $R^1$, $R^2$, $R^3$, $R^4$, $R^5$, $R^6$, $R^7$, a, b, and c are same as in formulae (I) through (III).

14. A method of producing the resin composition according to claim 7, comprising making a modified ethylene-vinyl alcohol copolymer in contact with an aqueous solution containing alkali metal salt.

15. A modified ethylene-vinyl ester copolymer, wherein the copolymer is represented by formula (IV) and contents (mol %) of a, b, and c based on the total monomer units satisfy formulae (1) through (3), wherein formula (IV) is:

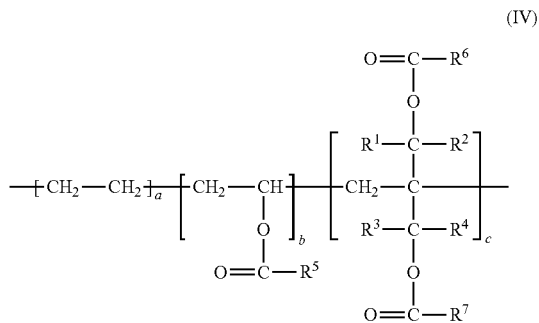

(IV)

where each of $R^1$, $R^2$, $R^3$, and $R^4$ independently denotes a hydrogen atom or an alkyl group having a carbon number of from 1 to 10, and the alkyl group may include a hydroxyl group, an alkoxy group, or a halogen atom; each of $R^5$, $R^6$, and $R^7$ independently denotes a hydrogen atom or an alkyl group having a carbon number of from 1 to 9;

where a, b and c conform to the ranges or relationships described by formulae (1), (2) and (3):

$$18 \leq a \leq 55 \quad (1)$$

$$0.01 \leq c \leq 20 \quad (2)$$

$$[100-(a+c)] \times 0.9 \leq b \leq [100-(a+c)] \quad (3).$$

16. A multilayer structure comprising: a layer of the modified ethylene-vinyl alcohol copolymer according to claim 1; and a layer of a thermoplastic resin other than the modified ethylene-vinyl alcohol copolymer.

17. The multilayer structure according to claim 16, wherein a layer of the modified ethylene-vinyl alcohol copolymer and a layer of the thermoplastic resin are adhered via an adhesive resin layer.

18. The multilayer structure according to claim 17, wherein the adhesive resin is polyolefin containing a carboxyl group, a carboxylic anhydride group, or an epoxy group.

19. A heat shrink film comprising a layer of the resin composition according to claim 6.

20. The heat shrink film according to claim 19, wherein the film is stretched to seven times or more in an area ratio.

21. The heat shrink film according to claim 19 further comprising a layer of a thermoplastic resin other than the modified ethylene-vinyl alcohol copolymer.

22. A coinjection stretch blow molded container comprising: a layer of the resin composition according to claim 6; and a layer of a thermoplastic resin other than the modified ethylene-vinyl alcohol copolymer.

23. The coinjection stretch blow molded container according to claim 22, wherein the thermoplastic resin is at least one selected from the group consisting of polyester, polypropylene, and polyethylene.

24. The coinjection stretch How molded container according to claim 22, wherein the layer of the thermoplastic resin is arranged to directly make contact with the layer of the resin composition.

25. A fuel container comprising a layer of the resin composition according to claim 6.

26. The fuel container according to claim 25 further comprising a layer of a thermoplastic resin other than the modified ethylene-vinyl alcohol copolymer.

27. The fuel container according to claim 26, wherein the thermoplastic resin is polyolefin.

28. The fuel container according to claim 26, wherein an intermediate layer is the layer of the resin composition, and on both sides thereof, inner and outer layers of the thermoplastic resin are arranged via an adhesive resin layer.

29. The fuel container according to claim 26, further comprising a regrind layer containing the modified ethylene-vinyl alcohol copolymer and the thermoplastic resin.

30. The fuel container according to claim 25, wherein the container is produced by blow molding.

31. The fuel container according to claim 25, wherein the container is produced by thermoforming.

* * * * *